United States Patent
Harding et al.

(10) Patent No.: US 12,551,682 B2
(45) Date of Patent: Feb. 17, 2026

(54) UNIVERSAL SINGLE-USE CAP FOR MALE AND FEMALE CONNECTORS

(71) Applicant: Becton, Dickinson and Company, Franklin Lakes, NJ (US)

(72) Inventors: Weston Harding, Lehi, UT (US); Chang Jiang, Butler, NJ (US); Austin Jason McKinnon, Herriman, UT (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 892 days.

(21) Appl. No.: 17/045,835

(22) PCT Filed: Apr. 9, 2019

(86) PCT No.: PCT/US2019/026487
§ 371 (c)(1),
(2) Date: Oct. 7, 2020

(87) PCT Pub. No.: WO2019/199750
PCT Pub. Date: Oct. 17, 2019

(65) Prior Publication Data
US 2021/0138221 A1    May 13, 2021

Related U.S. Application Data

(60) Provisional application No. 62/655,591, filed on Apr. 10, 2018.

(51) Int. Cl.
*A61M 39/16* (2006.01)
*A61M 5/00* (2006.01)
(Continued)

(52) U.S. Cl.
CPC .......... *A61M 39/162* (2013.01); *A61M 39/20* (2013.01); *A61M 39/22* (2013.01);
(Continued)

(58) Field of Classification Search
CPC .... A61M 39/162; A61M 39/20; A61M 39/22; A61M 2039/1033; A61M 2039/1077;
(Continued)

(56) References Cited

U.S. PATENT DOCUMENTS

| 8,172,825 B2 | 5/2012 | Solomon et al. |
| 2007/0112333 A1 | 5/2007 | Hoang et al. |

(Continued)

FOREIGN PATENT DOCUMENTS

| JP | 2012522593 A | 9/2012 |
| JP | 2013509274 A | 3/2013 |
| WO | 2014159346 A1 | 10/2014 |

OTHER PUBLICATIONS

PCT International Search Report and Written Opinion in PCT/US2019/026487 dated Jun. 26, 2019, 13 pages.

*Primary Examiner* — Chelsea E Stinson
*Assistant Examiner* — Hamza A Darb
(74) *Attorney, Agent, or Firm* — Servilla Whitney LLC

(57) ABSTRACT

A device for connection to a medical connector, the device includes a cap, a barrier wall, a first seal, a second seal, a first annular wall including a plurality of internal threads, and a second annular wall including a plurality of external threads. Also described is a device for connection to a medical connector, the device includes a cap, a first seal, a second seal, a first annular wall including a plurality of internal threads, and a second annular wall including a plurality of external threads. The cap configured to define a first chamber to contain an absorbent material and disinfectant or antimicrobial agent and a second chamber to contain an absorbent material and disinfectant or antimicrobial agent. The cap includes one or more internal threads adapted to engage with a female luer connector. The cap also includes one or more external threads adapted to engage with a male luer connector. The first seal and the second seal prevent the (Continued)

disinfectant or the antimicrobial agent from exiting the first chamber and the second chamber.

16 Claims, 25 Drawing Sheets

(51) Int. Cl.
*A61M 39/10* (2006.01)
*A61M 39/20* (2006.01)
*A61M 39/22* (2006.01)

(52) U.S. Cl.
CPC ............... *A61M 2039/1033* (2013.01); *A61M 2039/1077* (2013.01); *A61M 2039/1083* (2013.01); *A61M 2039/1088* (2013.01); *A61M 2039/229* (2013.01)

(58) Field of Classification Search
CPC .. A61M 2039/1083; A61M 2039/1088; A61M 2039/229; A61M 5/001; A61M 39/10; A61M 2039/1011; A61M 2039/1016; A61M 2039/1022; A61M 2039/1027; A61M 2039/1044; A61M 39/16
See application file for complete search history.

(56) References Cited

U.S. PATENT DOCUMENTS

| | | | | |
|---|---|---|---|---|
| 2011/0030726 A1* | 2/2011 | Vaillancourt | ............ | A61L 2/26 |
| | | | | 15/104.93 |
| 2012/0039764 A1* | 2/2012 | Solomon | ........... | A61M 25/0097 |
| | | | | 422/292 |

* cited by examiner

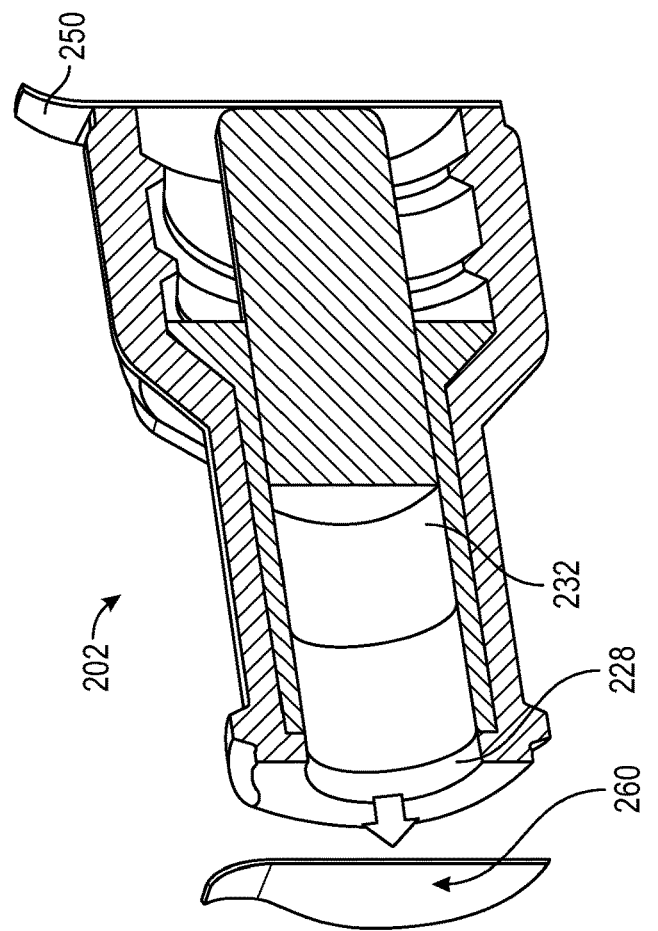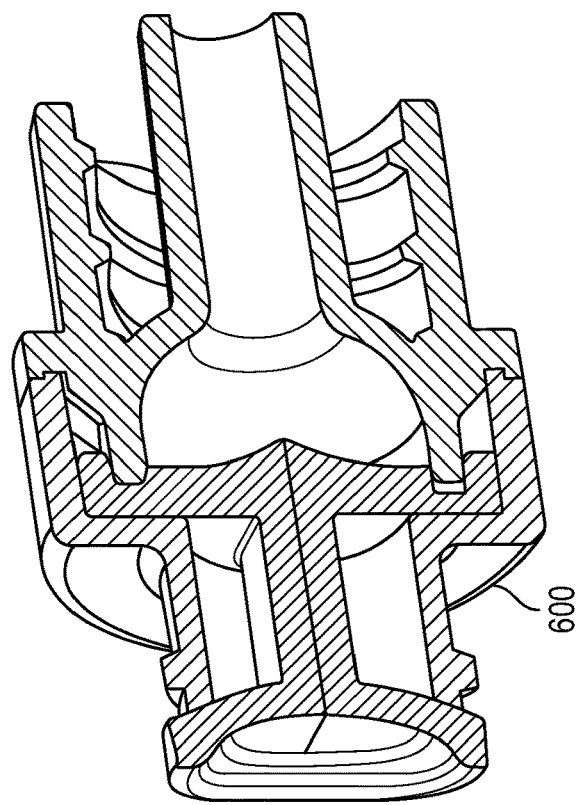
FIG. 19A

UNIVERSAL SINGLE-USE CAP FOR MALE AND FEMALE CONNECTORS

CROSS-REFERENCE TO RELATED APPLICATIONS

This application is the national stage entry of PCT/US2019/026487, filed on Apr. 9, 2019, which claims priority from provisional U.S. Patent Application No. 62/655,591 filed Apr. 10, 2018, the disclosures of which are hereby incorporated by reference in their entirety.

TECHNICAL FIELD

The present disclosure generally relates to a device for disinfecting and sterilizing access ports with, e.g., male and female luer fitting, and, in particular, to disinfecting and sterilizing devices capable of accommodating multiple types of connectors.

BACKGROUND

Vascular access devices (VAD's) are commonly used therapeutic devices and include intravenous (IV) catheters. There are two general classifications of VAD's, peripheral catheters and central venous catheters. Bacteria and other microorganisms may gain entry into a patient's vascular system from access hubs and ports/valves upon connection to the VAD to deliver the fluid or pharmaceutical. Each access hub (or port/valve or connection) is associated with some risk of transmitting a catheter related bloodstream infection (CRBSI), which can be costly and potentially lethal.

In order to decrease catheter-related bloodstream infection (CRBSI) cases and to ensure VAD's are used and maintained correctly, standards of practice have been developed, which include disinfecting and cleaning procedures.

Disinfection caps have been added to the Society for Healthcare Epidemiology of America (SHEA) guidelines and early indications are that caps will also be incorporated into the 2016 Infusion Nurses Standards (INS) guidelines.

In developed markets, when utilizing an IV catheter, a needleless connector will typically be used to close off the system and then subsequently accessed to administer medication or other necessary fluids via the catheter to the patient. INS Standards of Practice recommend the use of a needleless connector and state that it should be "consistently and thoroughly disinfected using alcohol, tincture of iodine or chlorhexidine gluconate/alcohol combination prior to each access." The disinfection of the needleless connector is ultimately intended to aid in the reduction of bacteria that could be living on the surface and possibly lead to a variety of catheter related complications including the CRBSI events described before. Nurses will typically utilize a 70% isopropyl alcohol (IPA) pad to complete this disinfection task by doing what is known as "scrubbing the hub." However, compliance to this practice is typically very low. In addition to a lack of compliance to "scrubbing the hub", it has also been noted through clinician interviews that there is often a variation in scrub time, dry time and the number of times the needleless connector is scrubbed.

Throughout the sequence of procedures associated with the transmission of a microorganism that can cause a CRBSI, there are many risks of contact or contamination. Contamination can occur during drug mixing, attachment of a cannula, and insertion into the access hub. Because the procedure to connect to a VAD is so common and simple, the risk associated with entry into a patient's vascular system has often been overlooked. Presently, the risk to hospitals and patients is a substantial function of the diligence of the clinician performing the connection, and this diligence is largely uncontrollable.

Currently, caps for male needleless connectors, female needleless connectors, intravenous (IV), and hemodialysis lines use different designs and are therefore limited to the types of connectors to which the cap can be attached. Thus, prior disinfecting caps were designed to fit one type of connector only, and were specific to one particular size and/or shape of connector. Thus, there is a need for a disinfecting device capable of accommodating multiple types of connectors to streamline the disinfecting process. There is also a need for a disinfecting device capable of continuous disinfection for multiple days.

SUMMARY

One aspect of the present disclosure pertains to device for connection to a medical connector. According to an exemplary embodiment of the present disclosure, the device generally comprises a cap, a first chamber, a second chamber, a barrier wall disposed between the first chamber and the second chamber, a first seal, a second seal, a first annular wall including a plurality of internal threads, and a second annular wall including a plurality of external threads, absorbent material, and a disinfectant or an antimicrobial agent. The cap comprises an integral body, a first end including a first annular wall having a length defining a first chamber having a first open end and a second end including a second annular wall having a length defining a second chamber a second open end. The first chamber containing an absorbent material and disinfectant or antimicrobial agent. The second chamber containing an absorbent material and disinfectant or antimicrobial agent. The barrier wall is disposed between the first chamber and the second chamber. The first seal on the first open end prevents the disinfectant or the antimicrobial agent from exiting the first chamber and the second seal on the second open end prevents disinfectant or antimicrobial agent from exiting the second chamber. In one or more embodiments, the annular wall of the cap is frusto-conically shaped.

The first annular wall comprises an exterior wall surface and an interior wall surface, the interior wall surface including a plurality of internal threads. In one or more embodiments, the internal threads partially extend along a length of the interior wall surface. In one or more embodiments, the internal threads fully extend along a length of the interior wall surface. In one or more embodiments, the plurality of internal threads is adapted for connection to a female luer connector. In one or more embodiments, the male connector is an intravenous tubing end. The second annular wall comprises an exterior wall surface and an interior wall surface, the exterior wall surface comprising a plurality of external threads. In one or more embodiments, the plurality of external threads is adapted for connection to a male luer connector. In one or more embodiments, the external threads extend from the second open end along less than one-half of the length of the second annular wall. In one or more embodiments, the female luer connector is selected from the group consisting essentially of needle-free connectors, stopcocks, and hemodialysis connectors.

The cap is made from any of a number of types of plastic materials such as polycarbonate, polypropylene, polyethylene, glycol-modified polyethylene terephthalate, acrylonitrile butadiene styrene or any other moldable plastic material used in medical devices. In one or more embodiments, the cap comprises a polypropylene or polyethylene material.

In one or more embodiments, the absorbent material is a nonwoven material, foam or a sponge. In a specific embodiment, the foam is a polyurethane foam. In one or more embodiments, the absorbent material comprises one or more grooves. In one or more embodiments, the one or more grooves are sized and adapted to receive a male luer connector, a female luer connector or a hemodialysis connector. In one or more embodiments, the one or more grooves comprise one or more concentric cylindrical grooves. In one or more embodiments, the concentric cylindrical groove corresponds with an end face of a stopcock. In one or more embodiments, the concentric cylindrical groove accommodates the lumen of a stopcock. In one or more embodiments, the absorbent material comprises one or more slits. In one or more embodiments, the one or more slits are sized and adapted to receive a male luer connector, a female luer connector or a hemodialysis connector. In one or more embodiments, the absorbent material is under radial compression by the internal threads to retain the absorbent material in the chamber. In one or more embodiments, the absorbent material is retained in the chamber without radial compression by the internal threads.

In one or more embodiments, the disinfectant or antimicrobial agent is selected from the group consisting essentially of isopropyl alcohol, ethanol, 2-propanol, butanol, methylparaben, ethylparaben, propylparaben, propyl gallate, butylated hydroxyanisole (BHA), butylated hydroxytoluene, t-butyl-hydroquinone, chloroxylenol, chlorohexidine, chlorhexidine diacetate, chlorohexidine gluconate, povidone iodine, alcohol, dichlorobenzyl alcohol, dehydroacetic acid, hexetidine, triclosan, hydrogen peroxide, colloidal silver, benzethonium chloride, benzalkonium chloride, octenidine, antibiotic, and mixtures thereof. In a specific embodiment, the disinfectant or antimicrobial agent comprises at least one of chlorhexidine gluconate and chlorhexidine diacetate. In one or more embodiments, the disinfectant or antimicrobial agent is a fluid or a gel.

In one or more embodiments, the absorbent material in the first chamber compresses upon connection to the male luer connector to disinfect the male luer connector. In one or more embodiments, the absorbent material in the second chamber compresses upon connection to the female luer connector to disinfect the female luer connector.

In one or more embodiments, the first seal and the second seal is a peelable seal. In one or more embodiments, the peelable seal comprises an aluminum or multi-layer polymer film peel back top. In a one or more embodiment, the first seal is heat-sealed or induction sealed to the first open end to retain the absorbent material within the first chamber. In a one or more embodiment, the second seal is heat-sealed or induction sealed to the second open end to retain the absorbent material within the second chamber.

In one or more embodiments, the exterior wall surface of the first annular wall includes a plurality of grip members. In one or more embodiments, the plurality of grip members extends along an entire length of the exterior wall surface of the cap. In yet another embodiment, the plurality of grip members partially extends along the length of the exterior wall surface of the cap. In one or more embodiments, the plurality of grip members is elongate. In one or more embodiments, the plurality of grip members is tapered.

A second aspect of the present disclosure pertains to methods of disinfecting medical connectors. In one or more embodiments, a method of disinfecting a medical connector comprises removing a first seal, connecting a male luer connector to the first open end to compress an absorbent material in a first chamber to have the disinfectant or antimicrobial agent contact and disinfect the male luer connector. In an alternate embodiment, a method of disinfecting a medical connector comprises removing a second seal, connecting a female luer connector to the second open end to compress an absorbent material in a second chamber to have the disinfectant or antimicrobial agent contact and disinfect the female luer connector. In yet another embodiment, a method of disinfecting a medical connector comprises removing a first seal, connecting a male luer connector to the first open end to compress an absorbent material in a first chamber to have the disinfectant or antimicrobial agent contact and disinfect the male luer connector, removing a second seal; and connecting a female luer connector to the second open end to compress an absorbent material in a second chamber to have the disinfectant or antimicrobial agent contact and disinfect the female luer connector.

A third aspect of the present disclosure pertains to an assembly. The assembly comprises the device of one or more embodiments connected to a medical connector. In one or more embodiments, the medical connector is selected from a male luer connector, a female luer connector, a needleless connector, stopcock, and hemodialysis connector.

BRIEF DESCRIPTION OF THE DRAWINGS

FIG. 19A shows a partial cross-sectional view showing connection of the device of FIG. 15 to a male luer connector taken along line 18-18 of FIG. 15;

DETAILED DESCRIPTION

Figure 1:
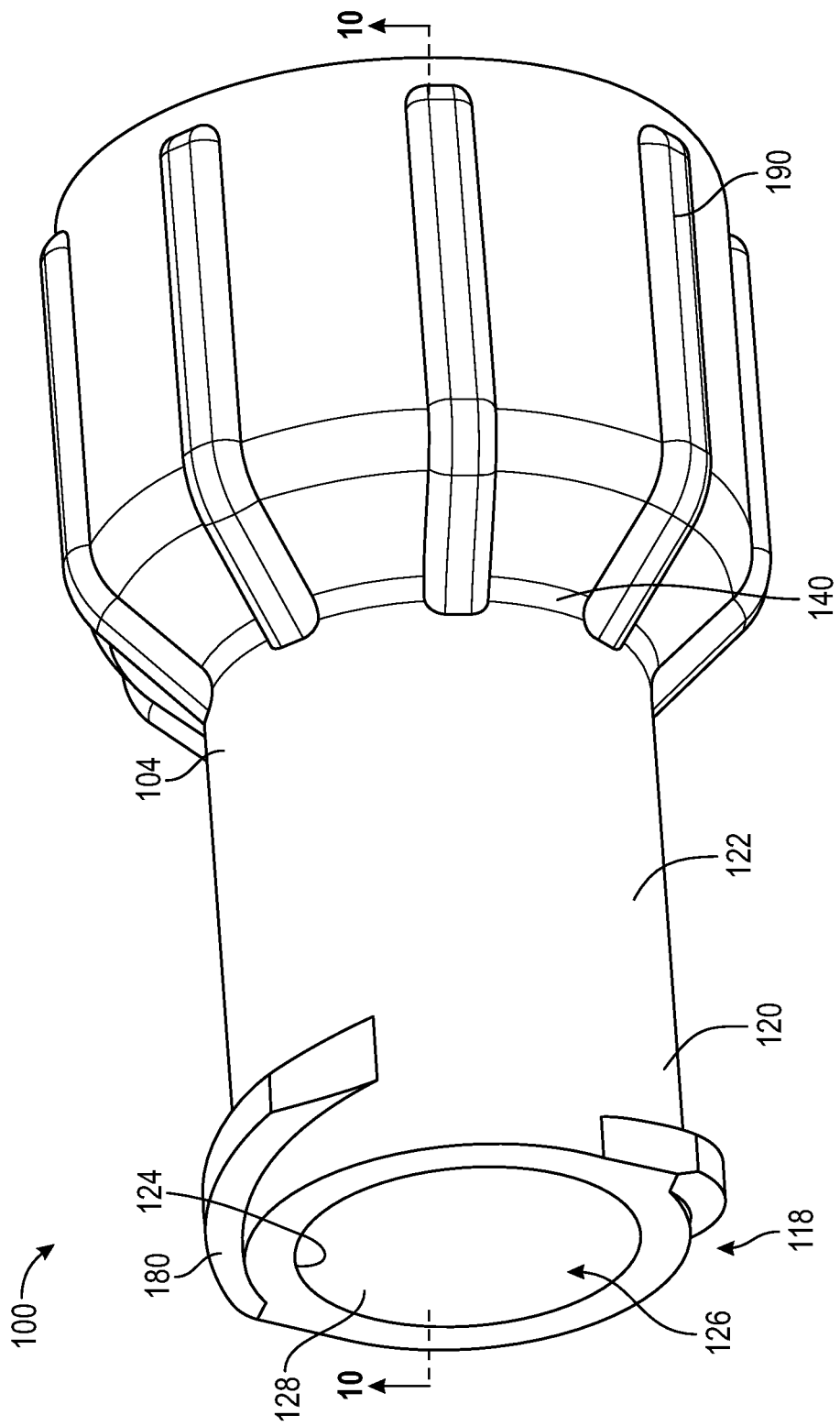
FIG. 1 shows a perspective view of an embodiment of a device of the present disclosure.
Figure 2:
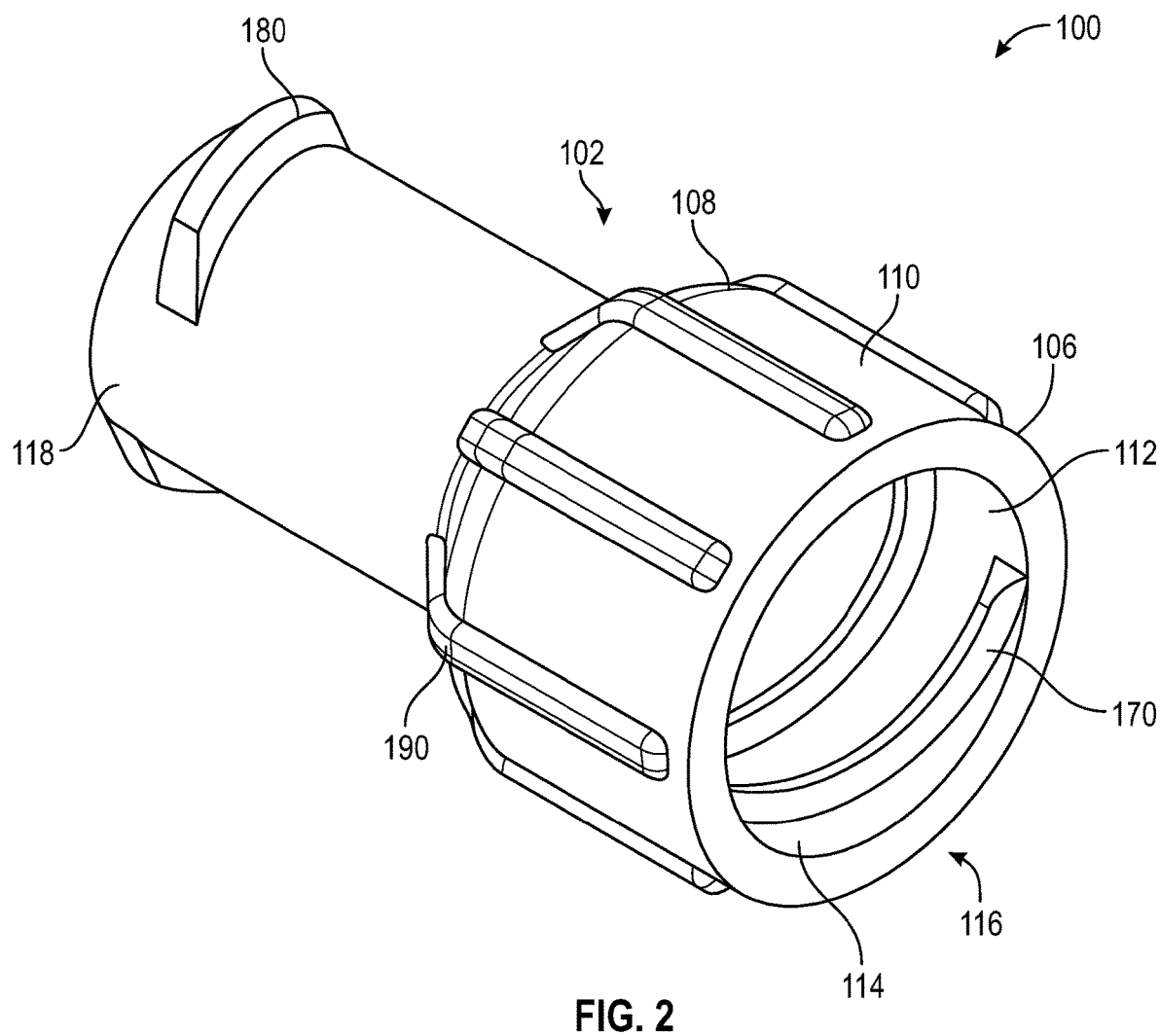
FIG. 2 shows a perspective view of an embodiment of a device of the present disclosure
Figure 3:
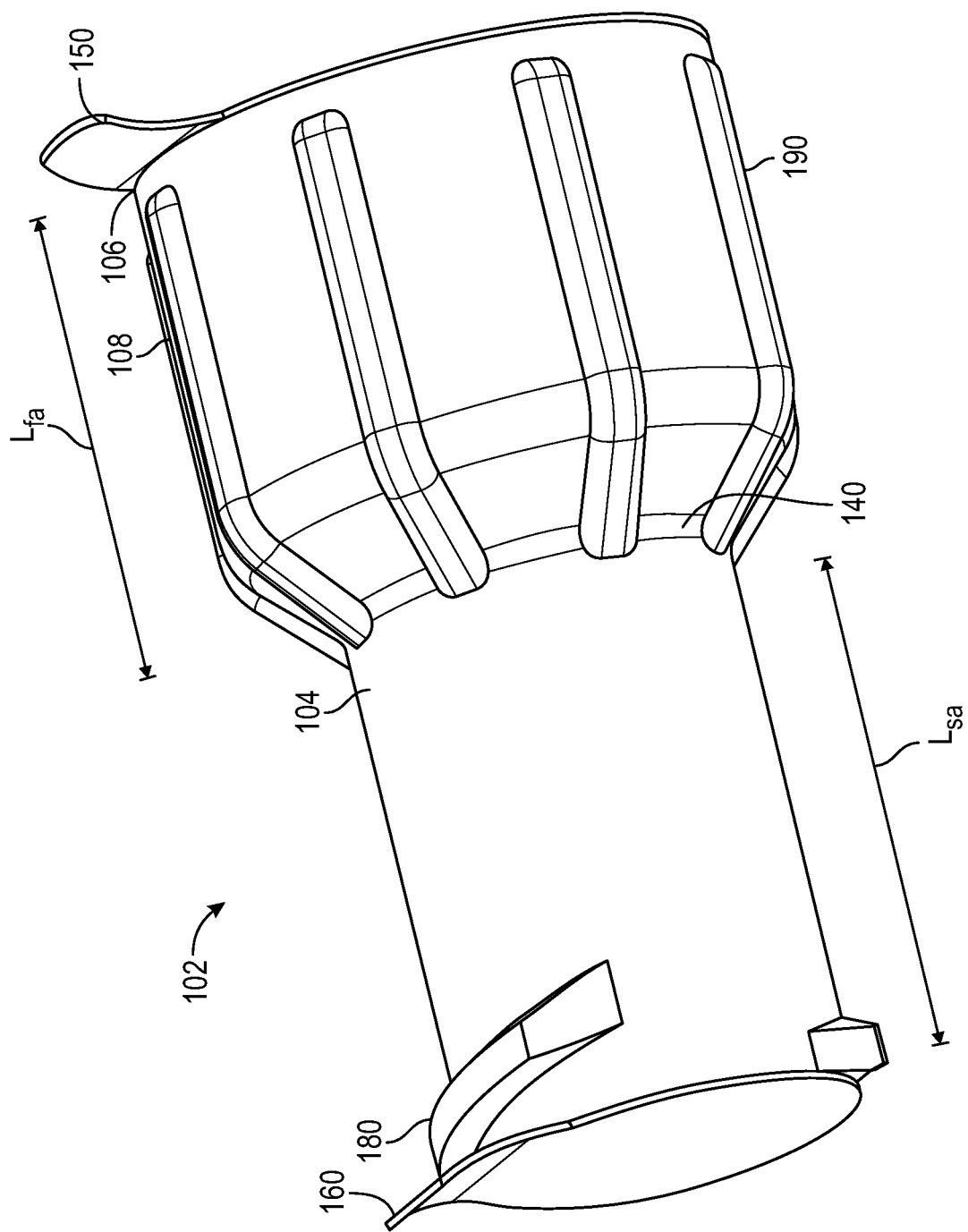
FIG. 3 shows a perspective view of an embodiment of a device of the present disclosure.
Figure 4:
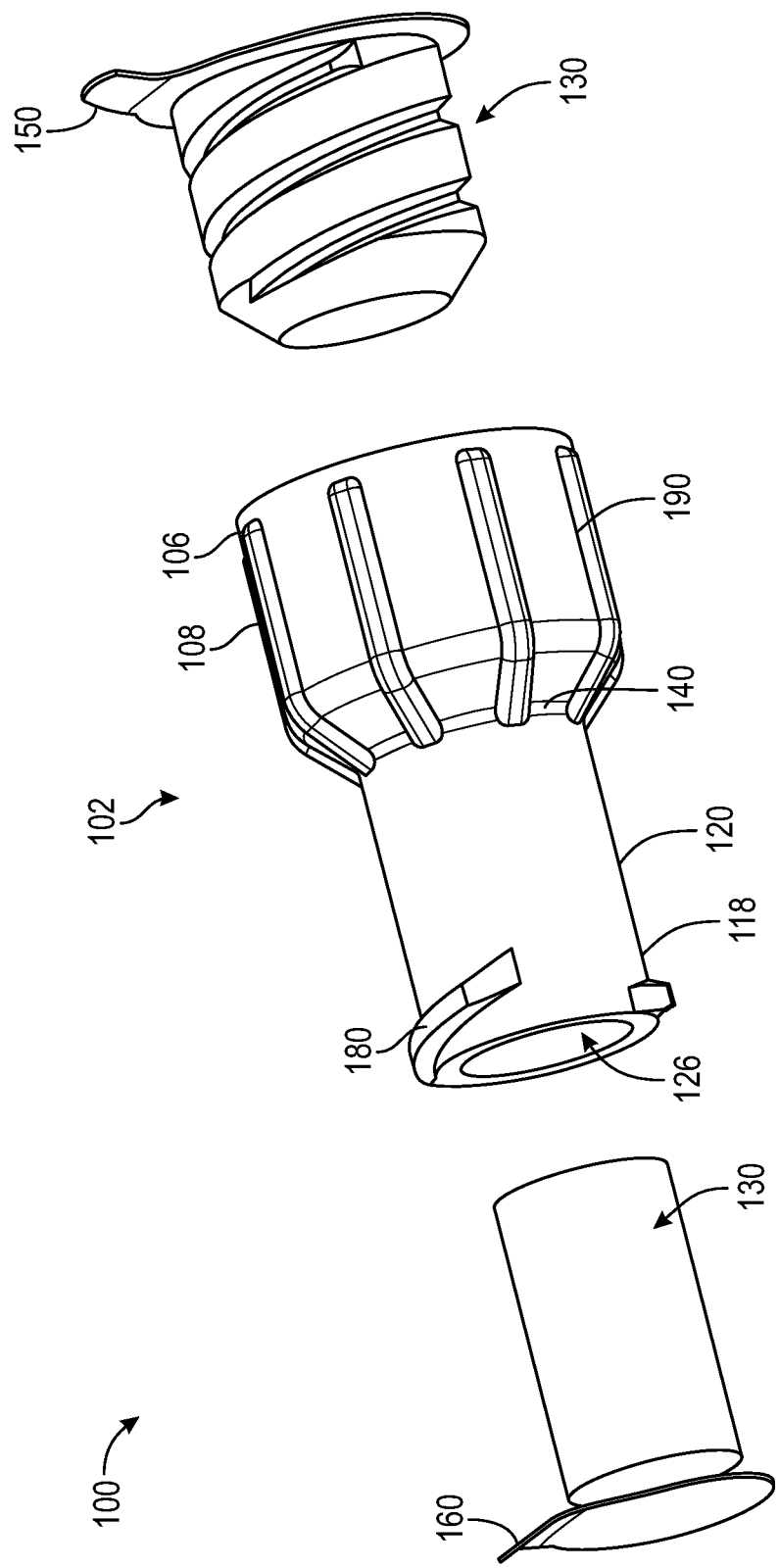
FIG. 4 shows a perspective exploded view of an embodiment of a device of the present disclosure.
Figure 5:
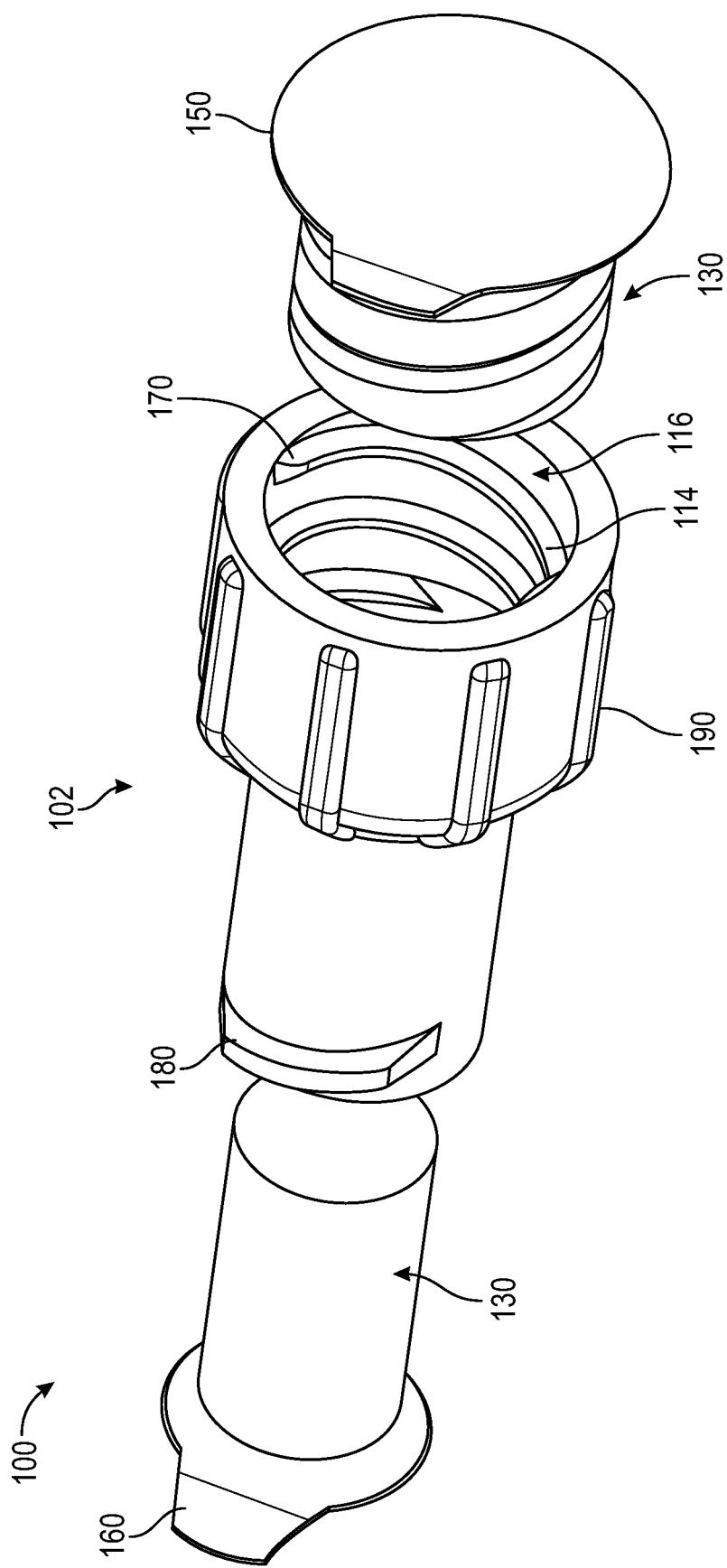
FIG. 5 shows a perspective exploded view of an embodiment of a device of the present disclosure.
Figure 6:
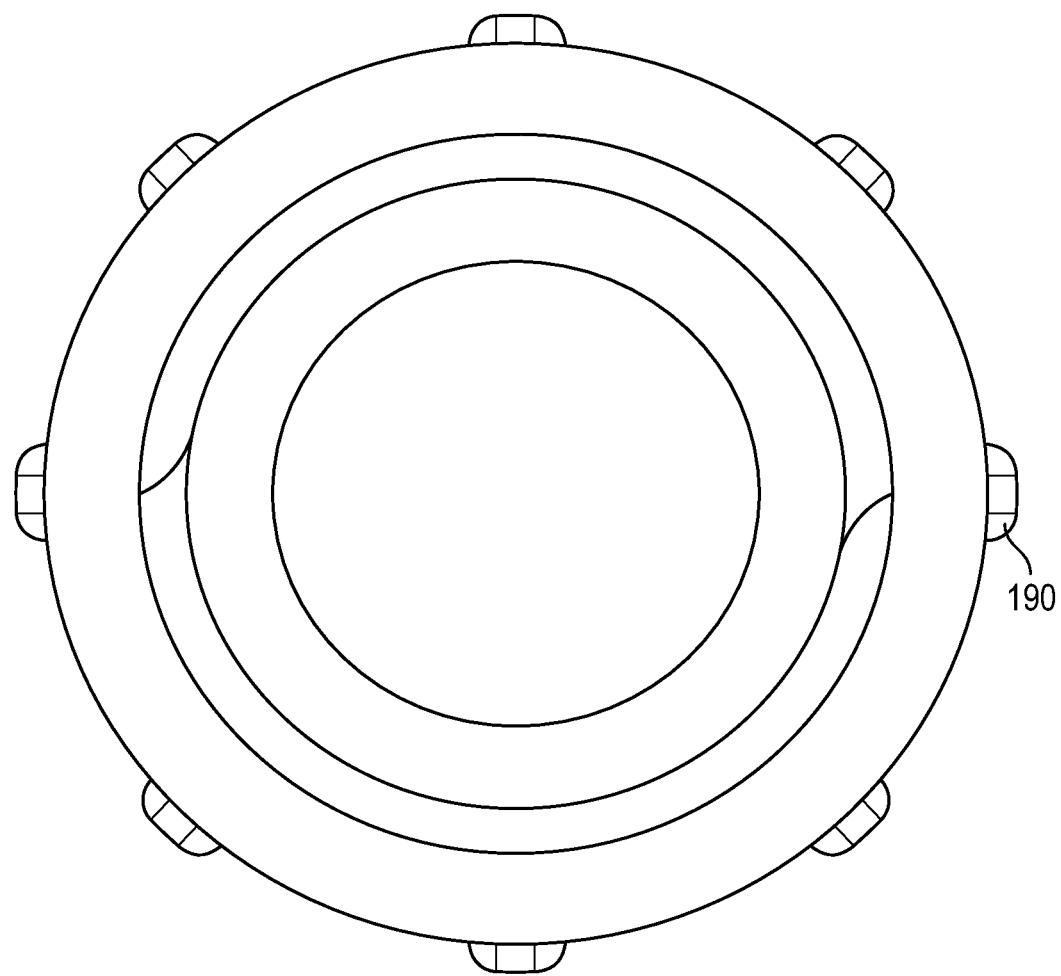
FIG. 6 shows a top view of an embodiment of a device of the present disclosure from a first end.
Figure 7:
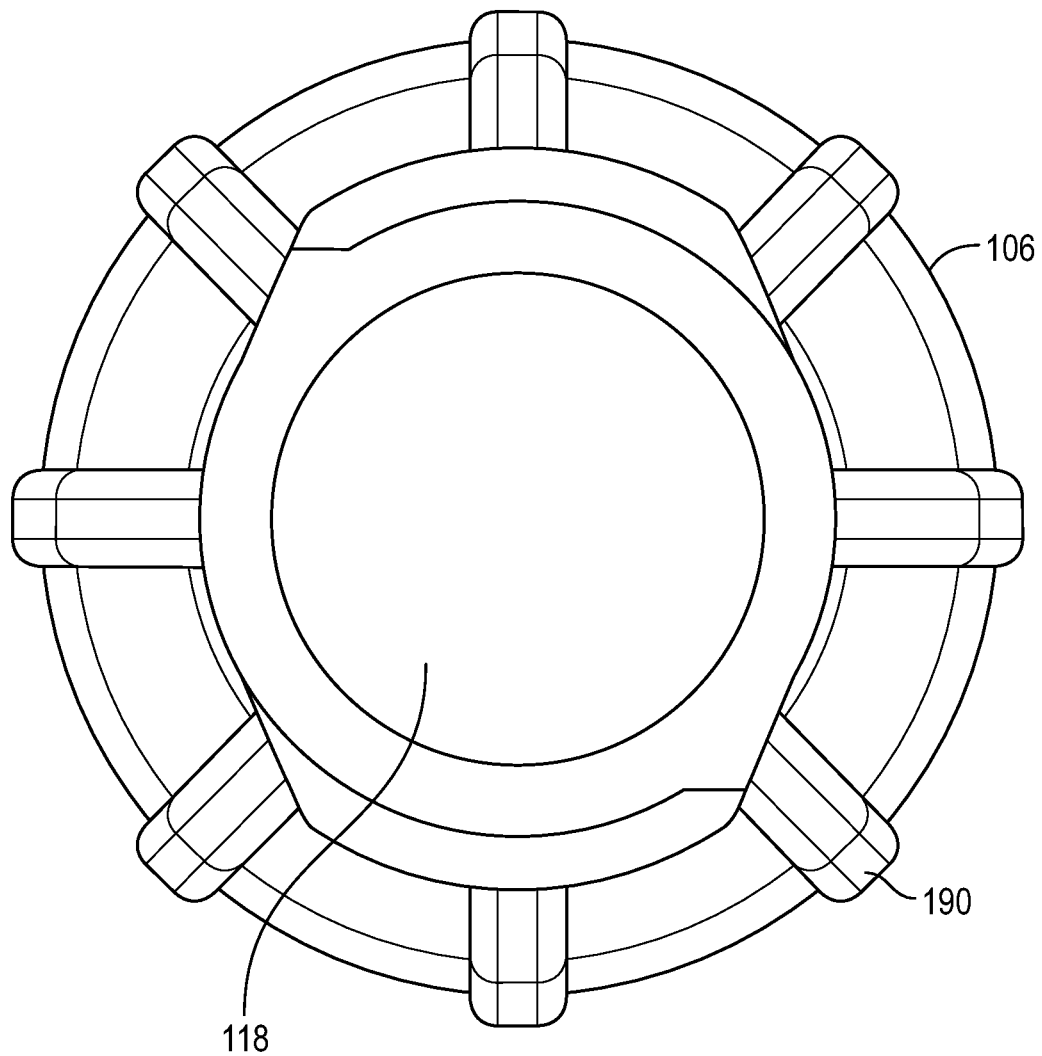
FIG. 7 shows a top view of an embodiment of a device of the present disclosure from a second end.
Figure 8:
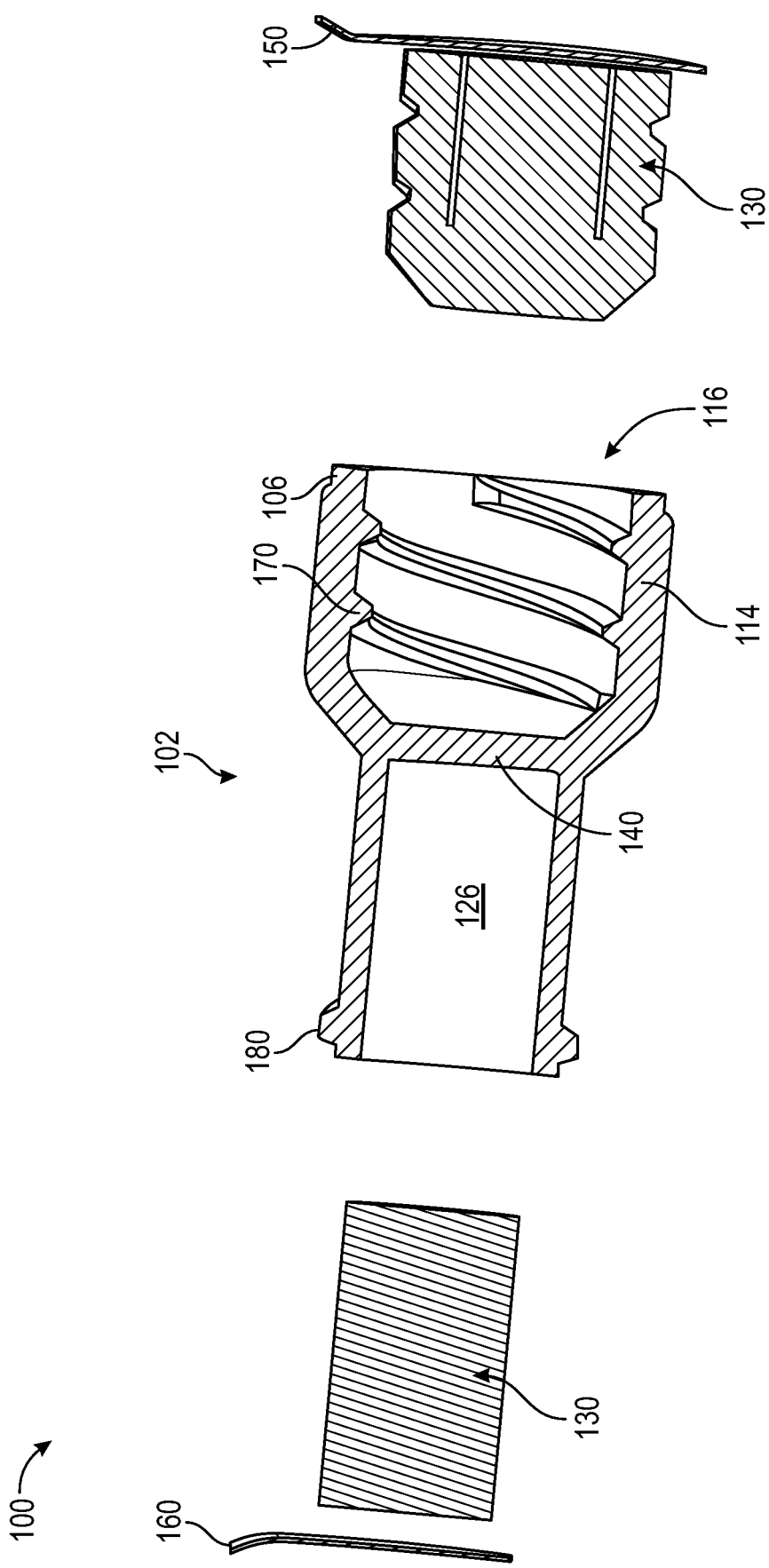
FIG. 8 shows a cross-sectional side exploded view of an embodiment of a device of the present disclosure having a first seal and a second seal.
Figure 9:
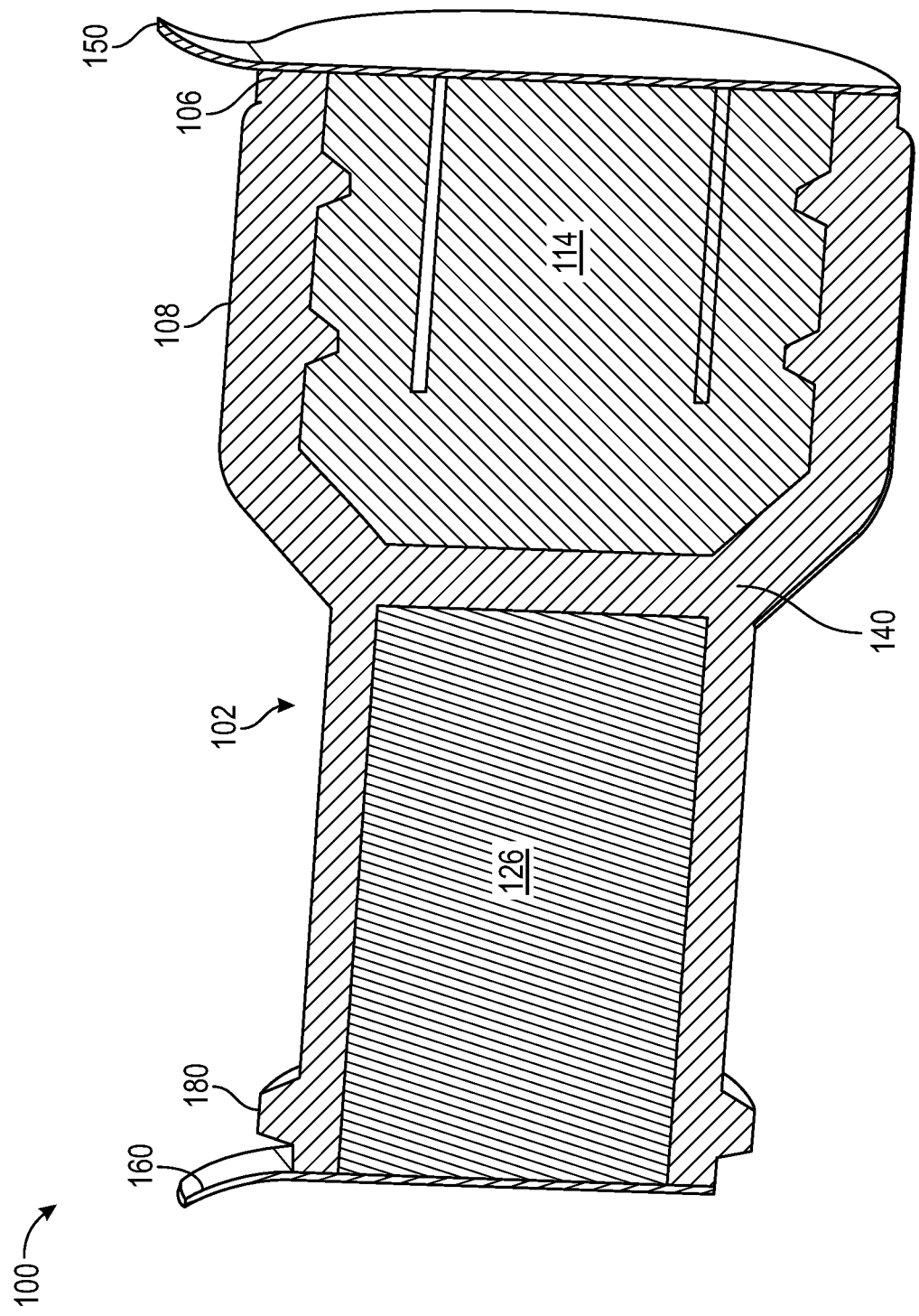
FIG. 9 shows a cross-sectional side view of an embodiment of a device of the present disclosure.
Figure 10:
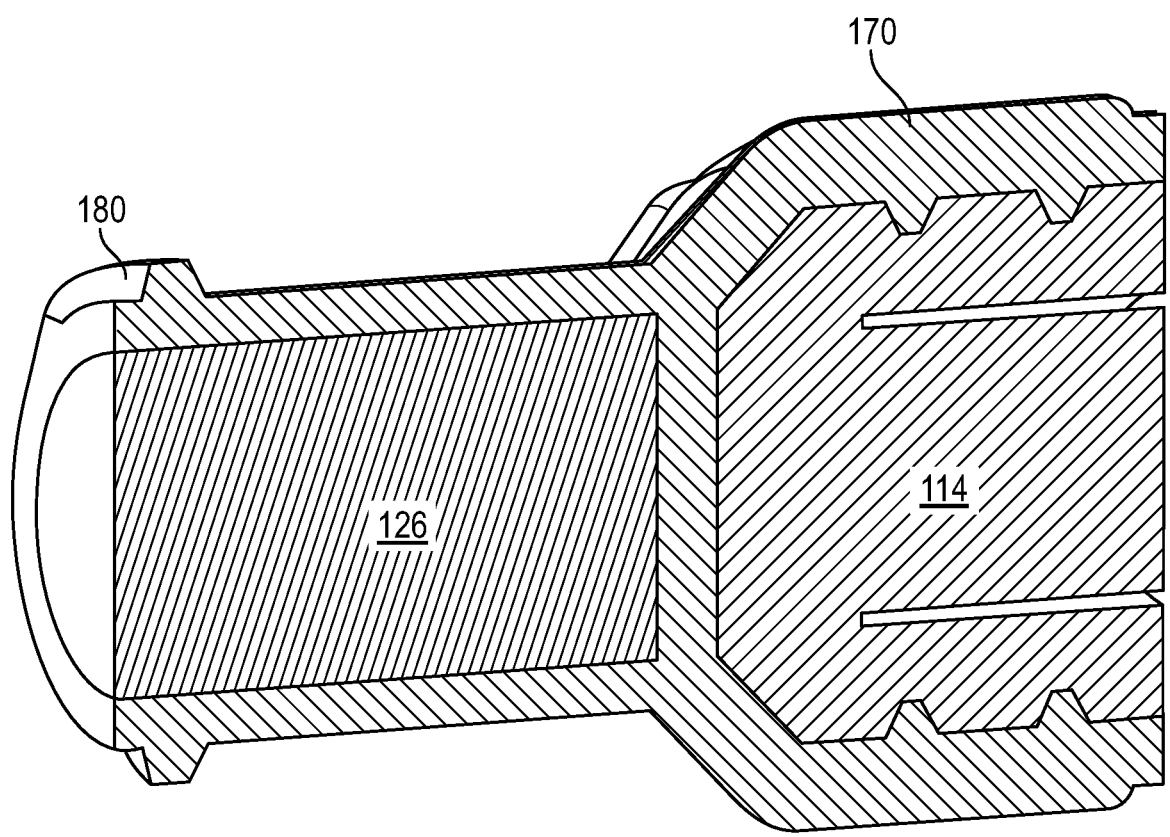
FIG. 10 shows a partial cross-sectional view of an embodiment of a device of the present disclosure taken along line 10-10 of FIG. 1.

Before describing several exemplary embodiments of the disclosure, it is to be understood that the disclosure is not limited to the details of construction or process steps set forth in the following description. The disclosure is capable of other embodiments and of being practiced or being carried out in various ways.

Embodiments of the disclosure pertain to a universal single-use device for connection to and disinfection of a medical connector, including male luer connectors and female luer connectors. The device of the present disclosure may be used with access ports, including needle-free connectors, male luer connectors on IV lines/extensions, open female luer on stopcocks, and hemodialysis connectors for disinfecting purpose. The device provides a mechanical barrier for connectors and contains an antimicrobial agent for disinfection. The device of the present disclosure allows the practitioner to streamline the disinfecting process.

With respect to terms used in this disclosure, the following definitions are provided.

As used herein, the use of "a," "an," and "the" includes the singular and plural.

As used herein, the term "catheter related bloodstream infection" or "CRBSI" refers to any infection resulting from the presence of a catheter or IV line.

As used herein, the term "Luer connector" refers to a connection collar that is the standard way of attaching syringes, catheters, hubbed needles, IV tubes, etc. to each other. The Luer connector comprises male and female interlocking tubes, slightly tapered to hold together better with even just a simple pressure/twist fit. Luer connectors can optionally include an additional outer rim of threading, allowing them to be more secure. The Luer connector male end is generally associated with a flush syringe and can interlock and connect to the female end located on the vascular access device (VAD). A Luer connector comprises a distal end, a proximal end, an irregularly shaped outer wall, a profiled center passageway for fluid communication from the chamber of the barrel of a syringe to the hub of a VAD. A Luer connector also has a distal end channel that releasably attaches the Luer connector to the hub of a VAD, and a proximal end channel that releasably attaches the Luer connector to the barrel of a syringe.

Referring to FIGS. 1-10, device 100 for connection to a medical connector according to an exemplary embodiment of the present disclosure generally comprises a cap 102, a first chamber 114, a second chamber 126, a barrier wall 140 disposed between the first chamber 114 and the second chamber 126, a first seal 150, a second seal 160, a first annular wall 108 including a plurality of internal threads 170, and a second annular wall 120 including a plurality of external threads 180, absorbent material 130, and a disinfectant or the antimicrobial agent. The cap 102 comprises an integral body 104, a first end 106 including a first annular wall 108 having a length $L_{fa}$ defining a first chamber 114 having a first open end 116 and a second end 118 including a second annular wall 120 having a length $L_{sa}$ defining a second chamber 126 having a second open end 128. The first chamber 114 contains an absorbent material 130 and disinfectant or antimicrobial agent. The second chamber 126 contains an absorbent material 130 and disinfectant or antimicrobial agent. The barrier wall 140 is disposed between the first chamber 114 and the second chamber 126. The barrier wall 140 separates the first chamber 114 and the second chamber 126 to maintain independence between male luer disinfection and female luer disinfection. Also in the event that a first seal 150 or second seal 160 on the non-disinfecting side is unintentional removed or damaged, the barrier wall 140 can still allow the disinfecting side to remain sterile by preventing fluid from the connector, e.g. IV tubings or stopcocks, from leaking through the cap 102.

The first seal 150 on the first open end 116 prevents the disinfectant or the antimicrobial agent from exiting the first chamber 114 and the second seal 160 on the second open end 128 prevents disinfectant or antimicrobial agent from exiting the second chamber 126. In one or more embodiments, the annular wall of the cap 102 extending from the first annular wall 108 to the second annular wall 120 is frusto-conically shaped.

The first annular wall 108 comprises an exterior wall surface 110 and an interior wall surface 112, the interior wall surface 112 including a plurality of internal threads 170. In one or more embodiments, the internal threads 170 partially extend along a length of the interior wall surface 112. In one or more embodiments, the internal threads 170 fully extend along a length of the interior wall surface 112. In one or more embodiments, the plurality of internal threads 170 is adapted for connection to a female luer connector 300. In one or more embodiments, the female luer connector 300 may comprise a needle-free connector, stopcock, and/or hemodialysis connector. In one or more embodiments, the needleless connector is selected from a Q-Syte connector, MaxPlus, MaxPlus Clear, MaxZero, UltraSite, Caresite, InVision-Plus, Safeline, OneLink, V-Link, ClearLink, NeutraClear, Clave, MicroClave, MicroClave Clear, Neutron, NanoClave, Kendall, Nexus, InVision, Vadsite, Bionector, etc. The second annular wall 120 comprises an exterior wall surface 122 and an interior wall surface 124, the exterior wall surface 122 comprising a plurality of external threads 180. In one or more embodiments, the plurality of external threads 180 is adapted for connection to a male luer connector 400. In one or more embodiments, the external threads 180 extend from the second open end 128 along less than one-half of the length of the second annular wall 120. In one or more embodiments, the male connector is an intravenous tubing end.

In one or more embodiments, the female connector 200 may comprise a needle-free connector, catheter luer connector, stopcock, and/or a hemodialysis connector 500. In one or more embodiments, the female connector includes female luer connectors.

In one or more embodiments, the male connector 400 may comprise an intravenous tubing end, stopcock or male lock luer. In one or more embodiments, the male connector includes male luer connectors.

In one or more embodiments, internal threads 170 may be disposed adjacent the bottom of the first chamber 114 of the cap and partially extend along a length of the interior wall surface 112 of the cap.

In one or more embodiments, the male luer connector engages the plurality of external threads 180 upon insertion into the chamber.

In one or more embodiments, the annular wall of the cap 102 extending from the first annular wall 108 to the second annular wall 120 is frusto-conically shaped.

The cap 102 is made from any of a number of types of plastic materials such as polycarbonate, polypropylene, polyethylene, glycol-modified polyethylene terephthalate, acrylonitrile butadiene styrene or any other moldable plastic material used in medical devices. In one or more embodiments, the cap 102 comprises a polypropylene or polyethylene material. In one or more embodiments, the exterior wall surface 110 of the first annular wall 108 includes a plurality of grip members 190.

Figure 12:
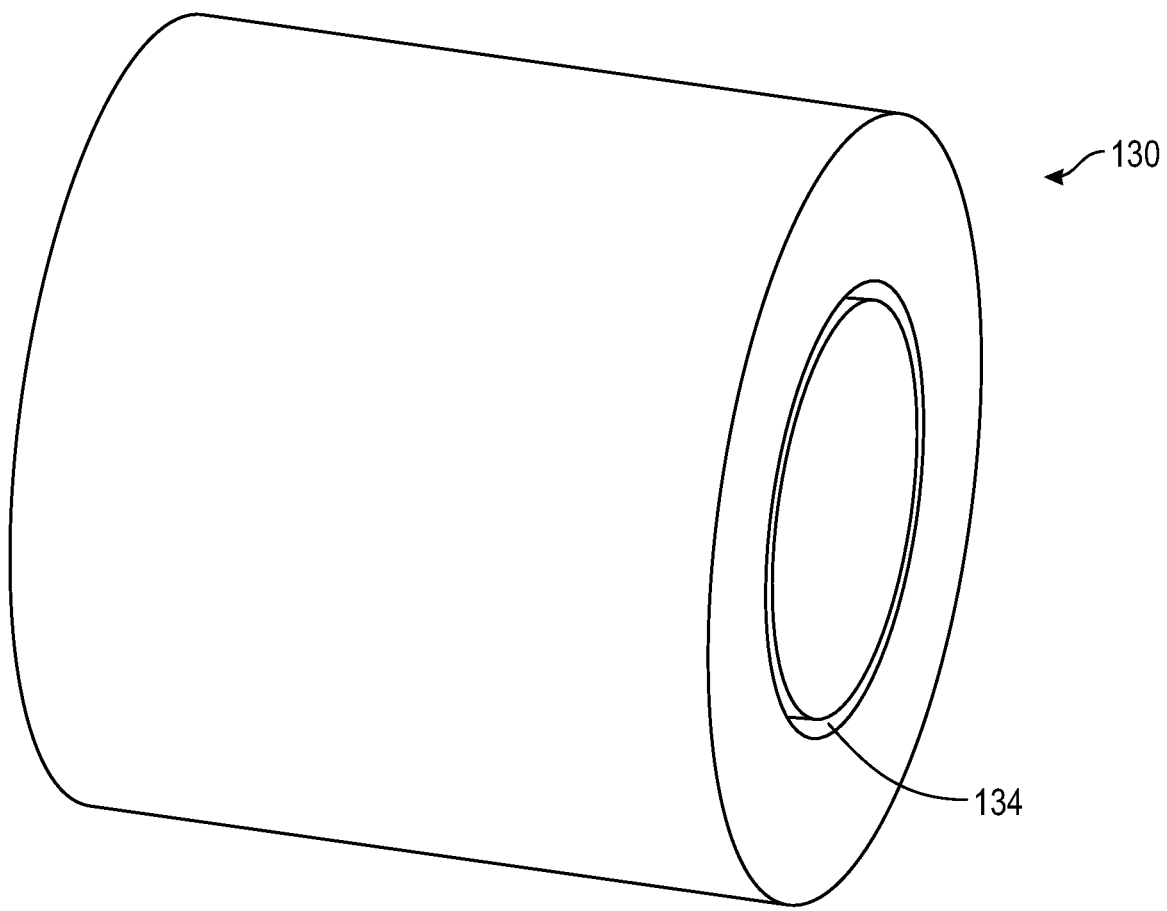
FIG. 12 shows a perspective view of an absorbent material of an embodiment of a device of the present disclosure adapted for connection with a female connector.
Figure 13:
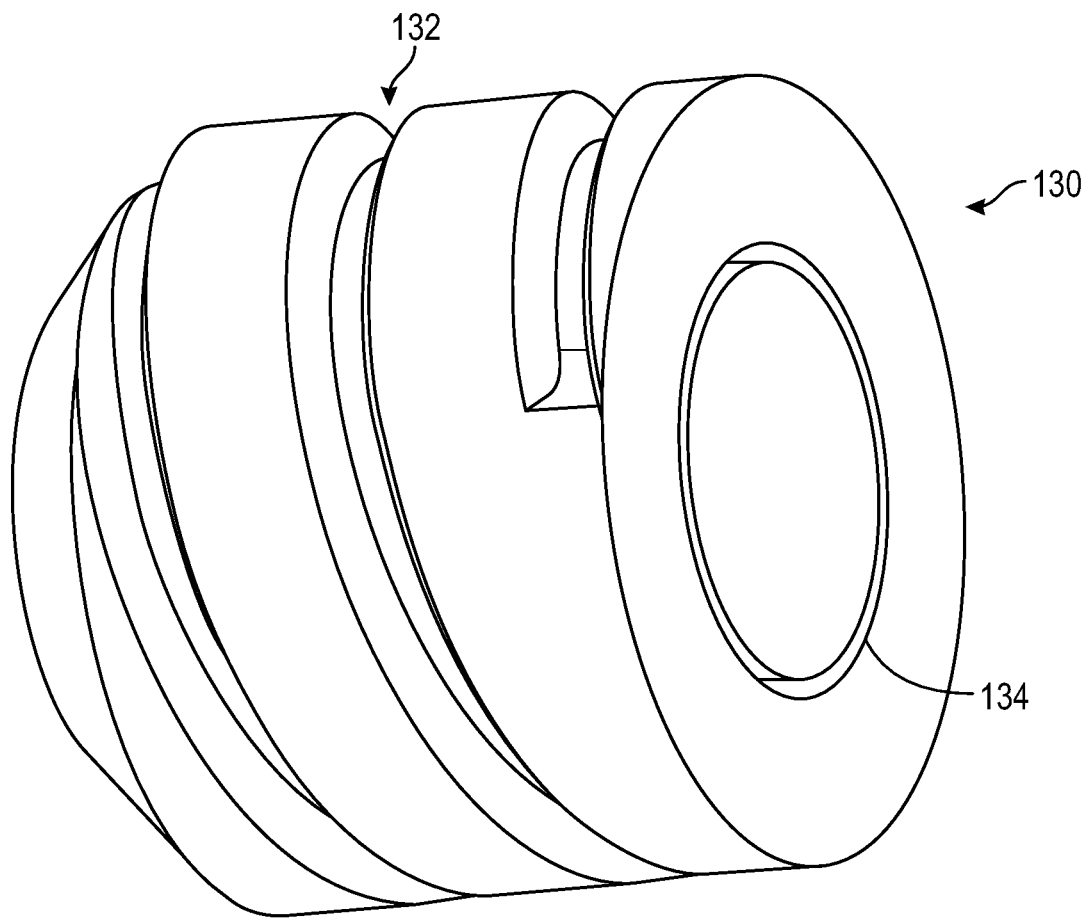
FIG. 13 shows a perspective view of an absorbent material of an embodiment of a device of the present disclosure adapted for connection with a female connector.
Figure 14:
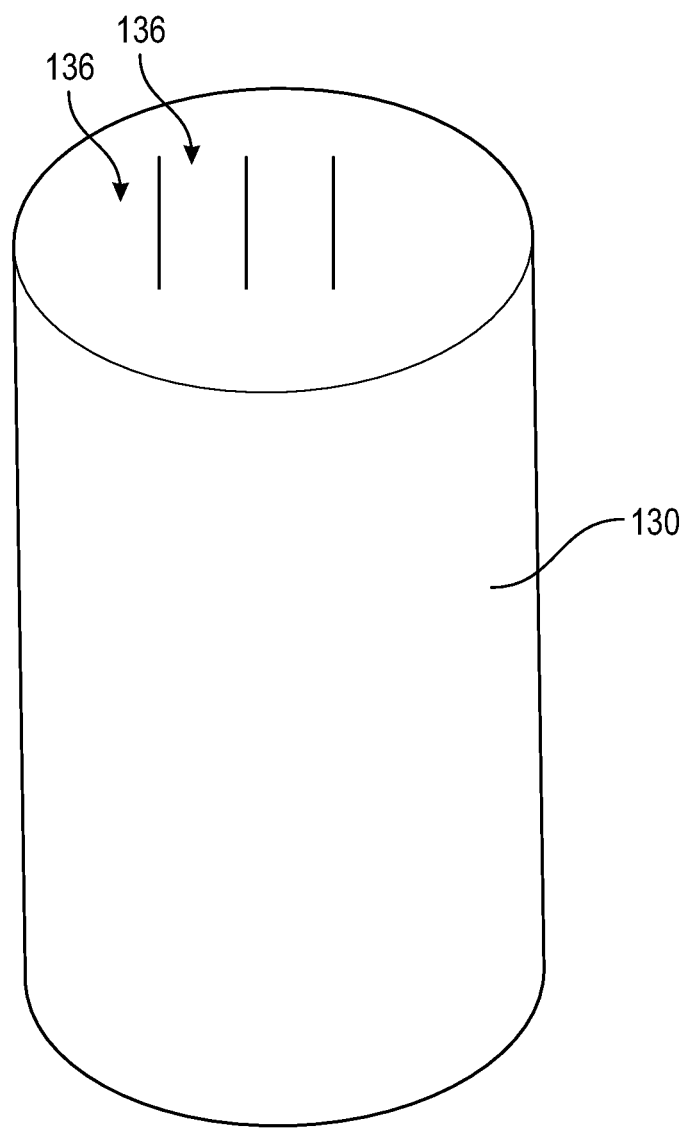
FIG. 14 shows a perspective view of an absorbent material of an embodiment of a device of the present disclosure adapted for connection with a male connector.

Exemplary embodiments of the absorbent material 130 is shown in FIGS. 12-14. In one or more embodiments, the absorbent material 130 is a nonwoven material, foam or a sponge. In a specific embodiment, the foam is a polyurethane foam. In one or more embodiments, the absorbent material 130 comprises one or more grooves 132. In one or more embodiments, as shown in FIGS. 12-14, the one or more grooves 132 are sized and adapted to receive a male luer connector, a female luer connector or a hemodialysis connector. In one or more embodiments, as shown in FIG. 13, the one or more grooves 132 are disposed on the sidewall of the absorbent material and are sized and adapted to receive a corresponding thread disposed on the inner annular of the first chamber and/or second chamber. In one or more embodiments, as shown in FIGS. 12 and 13, the one or more grooves 132 comprise one or more concentric cylindrical grooves 134 which are cut into the absorbent material having a disinfectant or antimicrobial agent. In one or more embodiments, for example as shown in FIGS. 12 and 13, the concentric cylindrical groove 134 corresponds with an end face of a stopcock.

In one or more embodiments, the concentric cylindrical groove accommodates the lumen of a stopcock to enhance the cleaning of the lumen of stopcock. In a specific embodiment, when stopcocks are screwed onto the chamber of device 100, the concentric cylindrical groove of the absorbent material will be inserted into the lumen of the stopcock to sterilize the inner side of stopcocks. In one or more embodiments, the absorbent material 130 comprises one or more slits 136. In one or more embodiments, the one or more slits 136 are sized and adapted to receive a male luer connector 400, a female luer connector 300 or a hemodialysis connector 500. In a specific embodiment the absorbent material 130 is in the form of a foam plug. In one or more embodiments, the absorbent material 130 is under radial compression by the internal threads 170 to retain the absorbent material in the chamber. In one or more embodiments, the absorbent material is retained in the chamber without radial compression by the internal threads.

Device 100 can achieve disinfection when used on luer connectors by integrating disinfectant or antimicrobial agent in the first chamber 114 and/or second chamber 126 of the cap. The disinfectant or antimicrobial agent can be directly included in the first chamber 114 and/or second chamber 126 or disinfectant or antimicrobial agent can be absorbed into absorbent material 130 that fills the first chamber 114 and/or second chamber 126. Device 100 is designed to be compatible in interacting with various disinfectants. In one or more embodiments, the disinfectant or antimicrobial agent is selected from the group consisting essentially of isopropyl alcohol, ethanol, 2-propanol, butanol, methylparaben, ethylparaben, propylparaben, propyl gallate, butylated hydroxyanisole (BHA), butylated hydroxytoluene, t-butylhydroquinone, chloroxylenol, chlorohexidine, chlorhexidine diacetate, chlorhexidine gluconate, povidone iodine, alcohol, dichlorobenzyl alcohol, dehydroacetic acid, hexetidine, triclosan, hydrogen peroxide, colloidal silver, benzethonium chloride, benzalkonium chloride, octenidine, antibiotic, and mixtures thereof. In one or more embodiments, the disinfectant or antimicrobial agent may include variations of alcohol or chlorhexidine. In a specific embodiment, the disinfectant or antimicrobial agent comprises at least one of chlorhexidine gluconate and chlorhexidine diacetate. In one or more embodiments, the disinfectant or antimicrobial agent is a fluid or a gel.

In one or more embodiments, the absorbent material 130 in the first chamber 114 compresses upon connection to the male luer connector to disinfect the male luer connector. In one or more embodiments, the absorbent material 130 in the second chamber 126 compresses upon connection to the female luer connector 300 to disinfect the female luer connector.

As shown in FIGS. 3-5, 8 and 9, the first seal 150 is disposed on the first open end 116 to prevent the disinfectant or the antimicrobial agent from exiting the first chamber 114 and a second seal 160 is disposed on the second open end 128 to prevent disinfectant or antimicrobial agent from exiting the second chamber 126. In a one or more embodiment, the first seal 150 is heat-sealed or induction sealed to the first open end 116 to retain the absorbent material 130 within the first chamber 114. In a one or more embodiment, the second seal 160 is heat-sealed or induction sealed to the second open end 128 to retain the absorbent material 130 within the second chamber 126.

Figure 11:
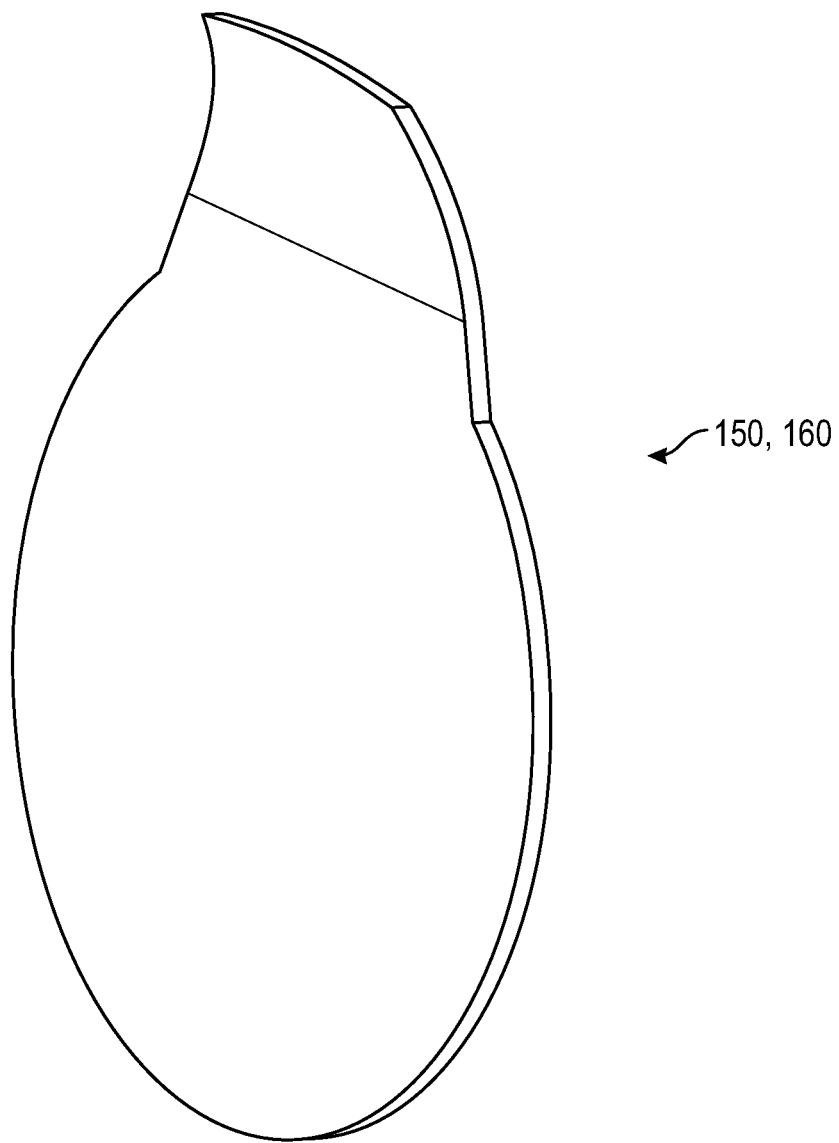
FIG. 11 shows a perspective view of a first seal or second seal an embodiment of a device of the present disclosure.

An exemplary embodiment of the first seal 150 and/or second seal 160 is shown in FIG. 11. In one or more embodiments, the first seal 150 and the second seal 160 is a peelable seal. In one or more embodiments, the first seal 150 and the second seal 160 comprises an aluminum or multilayer polymer film peel back top. In one or more embodiments, the first seal 150 and the second seal 160 seal comprises a moisture barrier.

In one or more embodiments, the exterior wall surface 110 of the first annular wall 108 of the cap 102 includes a plurality of grip members 190. In one or more embodiments, the plurality of grip members 190 extends along an entire length of the exterior wall surface 110 of the cap. In yet another embodiment, the plurality of grip members 190 partially extends along the length of the exterior wall surface 110 of the cap. In one or more embodiments, the plurality of grip members 190 is elongate. In one or more embodiments, the plurality of grip members 190 is tapered.

Figure 15:
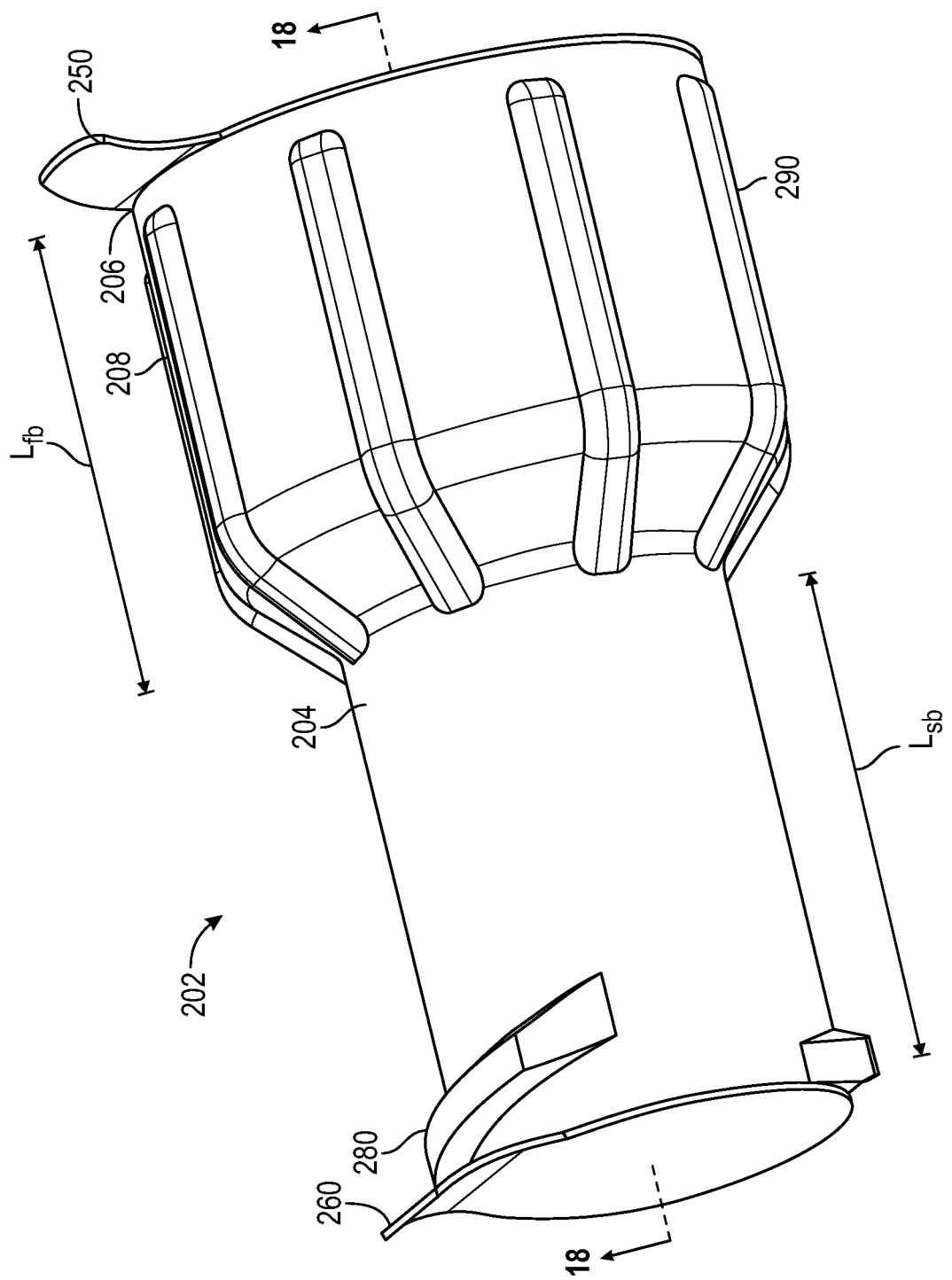
FIG. 15 shows a perspective view of an alternative embodiment of a device of the present disclosure.
Figure 16:
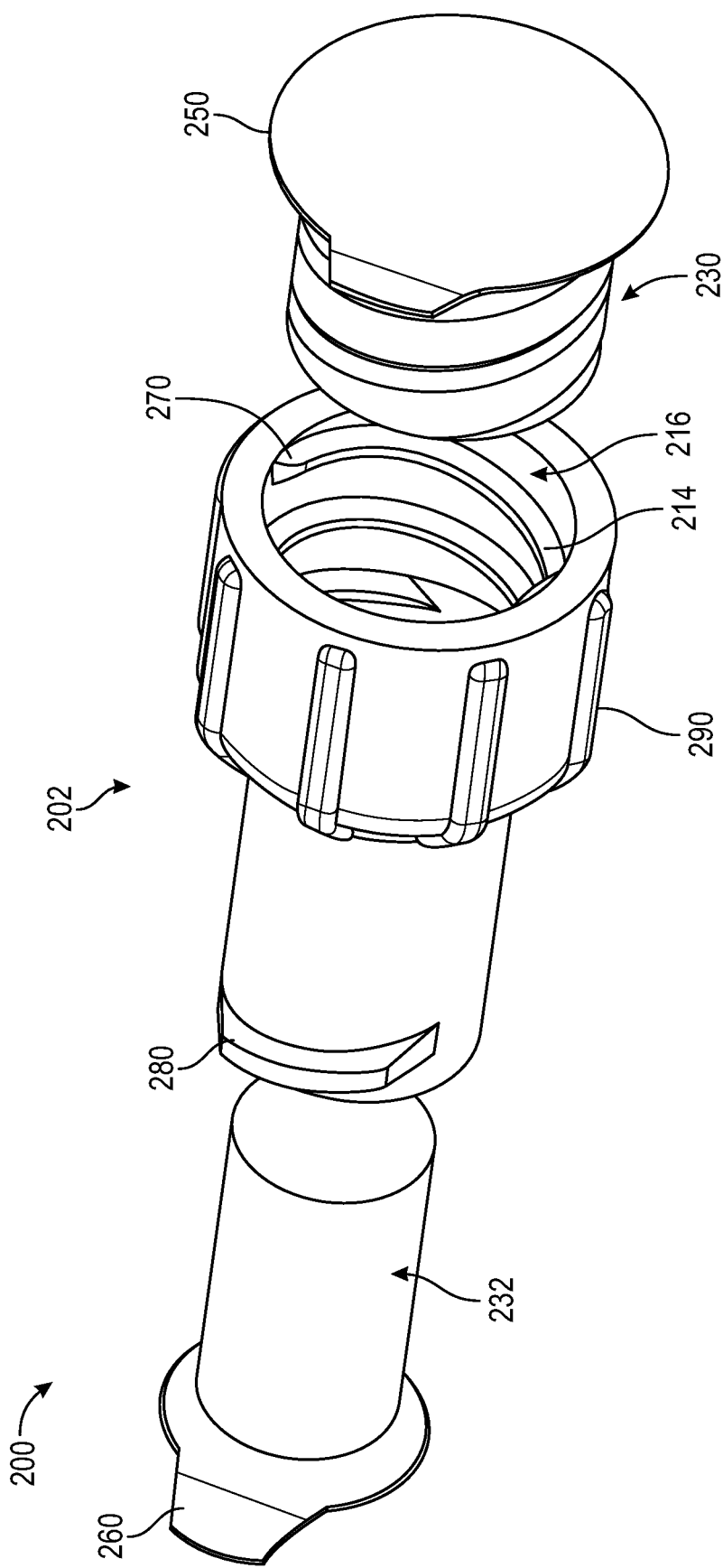
FIG. 16 shows an exploded perspective view of an alternative embodiment of a device of the present disclosure.
Figure 17:
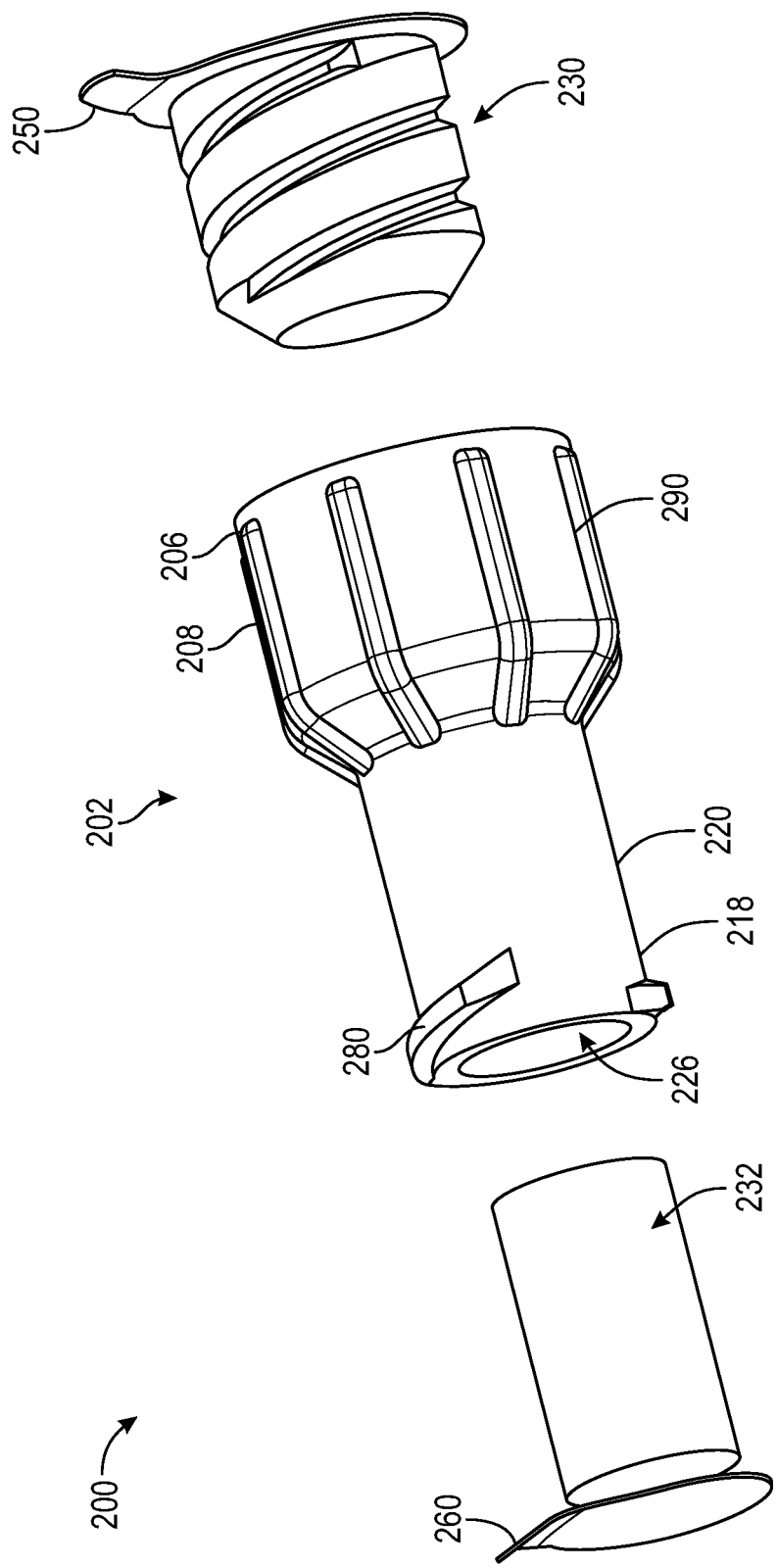
FIG. 17 shows an exploded perspective view of an alternative embodiment of a device of the present disclosure.
Figure 18:
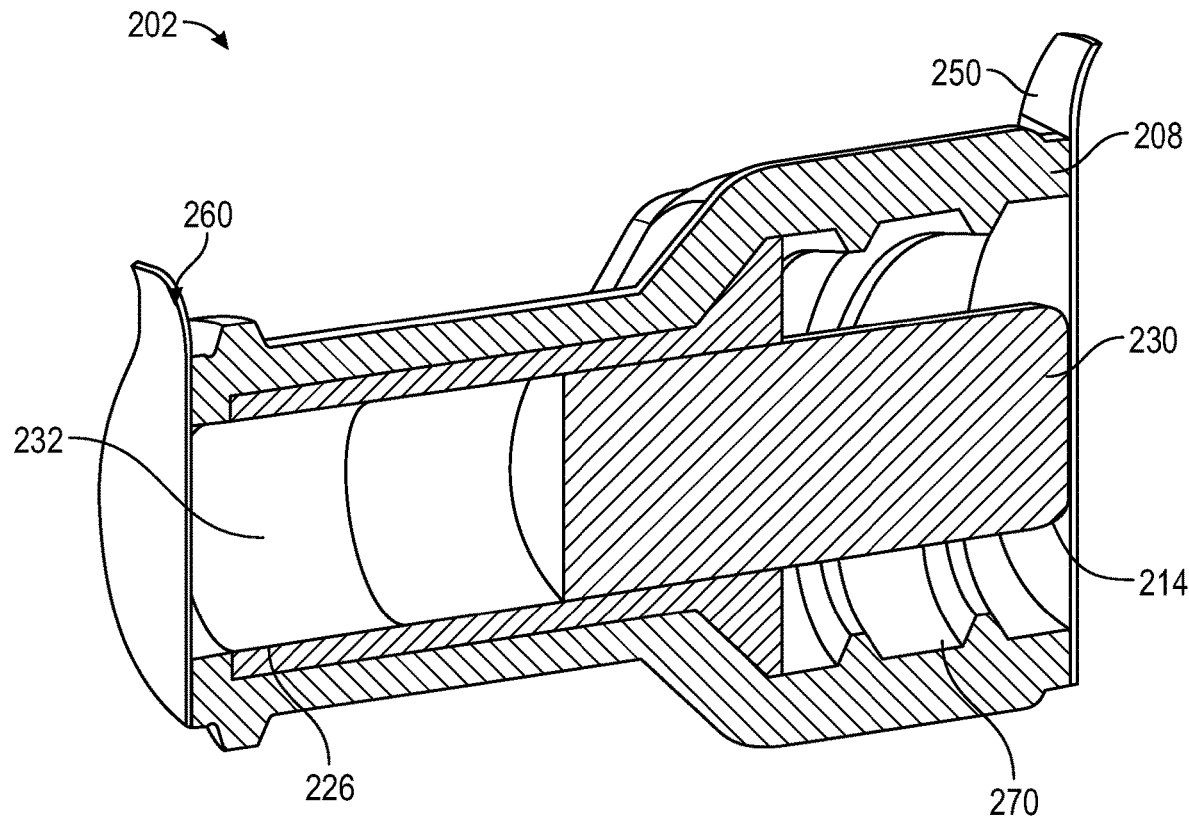
FIG. 18 shows a partial cross-sectional view of an alternative embodiment of a device of the present disclosure taken along line 18-18 of FIG. 15.

In an alternative embodiment of the present disclosure, referring to FIGS. 15-17, device 200 for connection to a medical connector according to an exemplary embodiment of the present disclosure generally comprises a cap 202, a first chamber 214, a second chamber 226, a first seal 250, a second seal 260, a first annular wall 208 including a plurality of internal threads 270, and a second annular wall 220 including a plurality of external threads 280, a first absorbent material 230, and a second absorbent material 232 and a disinfectant or an antimicrobial agent. The cap 202 comprises an integral body 204, a first end 206 including a first annular wall 208 having a length $L_{fb}$ defining a first chamber 214 having a first open end 216 and a second end 218 including a second annular wall 220 having a length $L_{sb}$ defining a second chamber 226 having a second open end 228. The first chamber 214 contains a first absorbent material 230 and disinfectant or antimicrobial agent. The second chamber 226 contains a second absorbent material 232 and disinfectant or antimicrobial agent. The second absorbent material 232 is held in place with a friction fit by extending into the first absorbent material 230. Upon connection to a medical connector such as a female luer, a male luer, or a needleless luer access device (LAD), the absorbent material (s) 230 and 232 are held in place by a friction fit, but the absorbent materials 230 and 232 can slide to accommodate a medical connector.

The cap 202 is made from any of a number of types of plastic materials such as polycarbonate, polypropylene, polyethylene, glycol-modified polyethylene terephthalate, acrylonitrile butadiene styrene or any other moldable plastic material used in medical devices. In one or more embodiments, the cap 202 comprises a polypropylene or polyethylene material. In one or more embodiments, the exterior wall surface 210 of the first annular wall 208 includes a plurality of grip members 290.

Figure 19B:
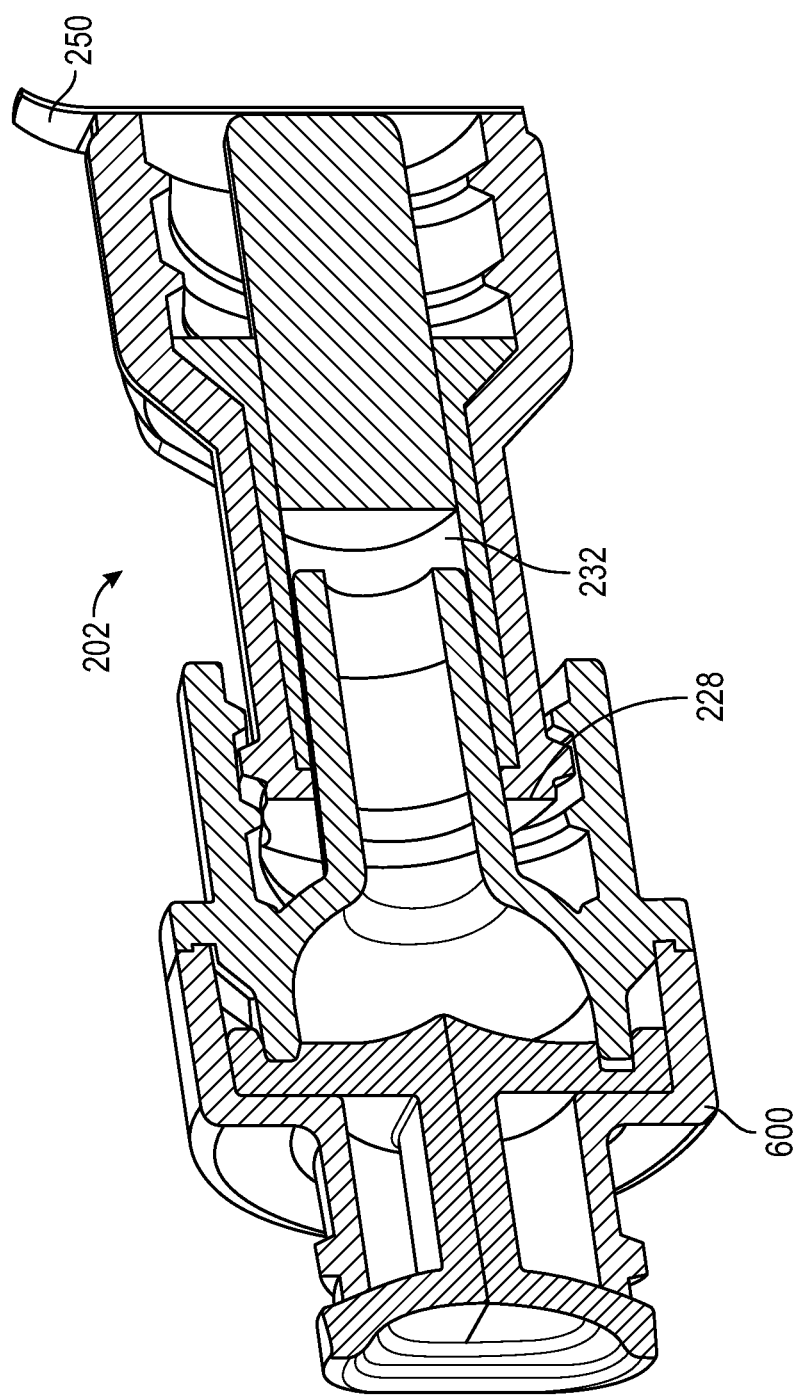
FIG. 19B shows a partial cross-sectional view showing connection of the device of FIG. 15 to a male luer connector taken along line 18-18 of FIG. 15.

Referring to FIGS. 19A and 19B, to cap and/or disinfect a male luer 600, the second seal 260 is removed and the cap 202 is attached via the second open end 228. The second absorbent material 232 is compressible, and twisting the cap 202 onto a male luer would insure the male luer surface would be in contact with the absorbent material 232 and a disinfectant or antimicrobial agent. The second open end 228 creates a fluid seal with the male luer, as does the unopened second seal 250 of the cap 202. The device 200 can remain on the male luer as long as needed to protect the male luer and keep it clean until the next use of the male luer.

Figure 20A:
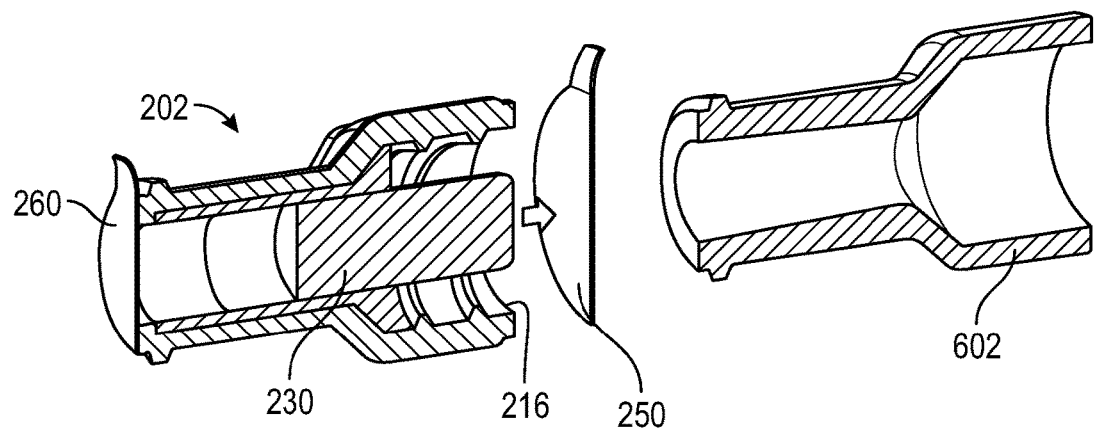
FIG. 20A shows a partial cross-sectional view showing connection of the device of FIG. 15 to a female luer connector taken along line 18-18 of FIG. 15.
Figure 20B:
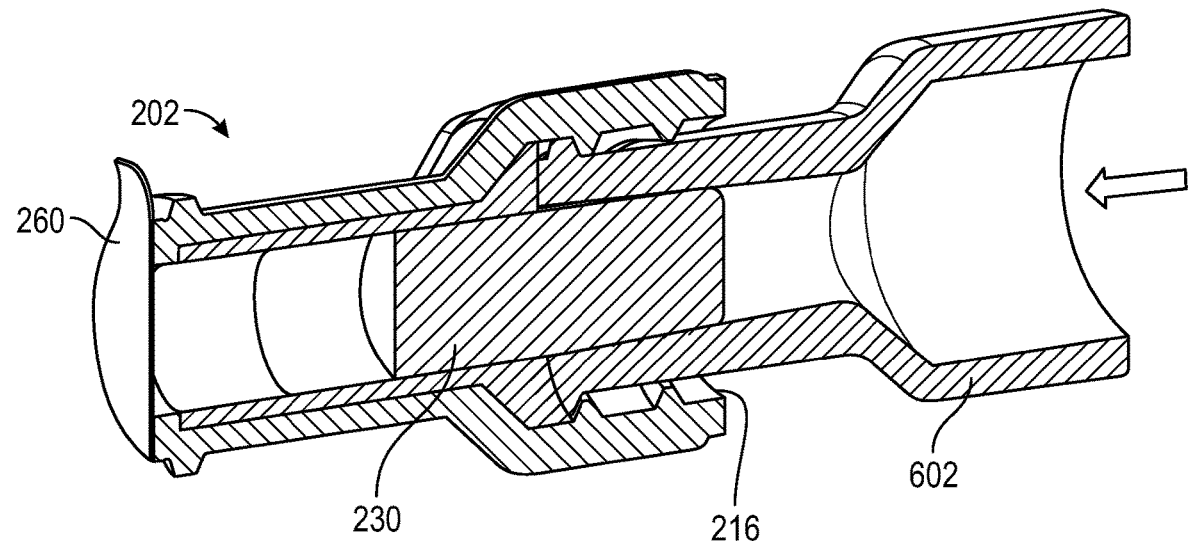
FIG. 20B shows a partial cross-sectional view showing connection of the device of FIG. 15 to a female luer connector taken along line 18-18 of FIG. 15.

Referring to FIGS. 20A and 20B, to cap and/or disinfect a female luer 602, like on a stopcock, the first seal 250 is removed and the cap 202 is attached via the first open end 216 to the female luer. The first absorbent material 230 will protrude into the female luer 602, allowing the disinfectant or antimicrobial agent to contact and disinfect the female luer taper 602. In one or more embodiments, the female luer 602 is not sealed by the device 200 because the fluid path is already stopped by the stopcock on the female luer 602.

Figure 21:
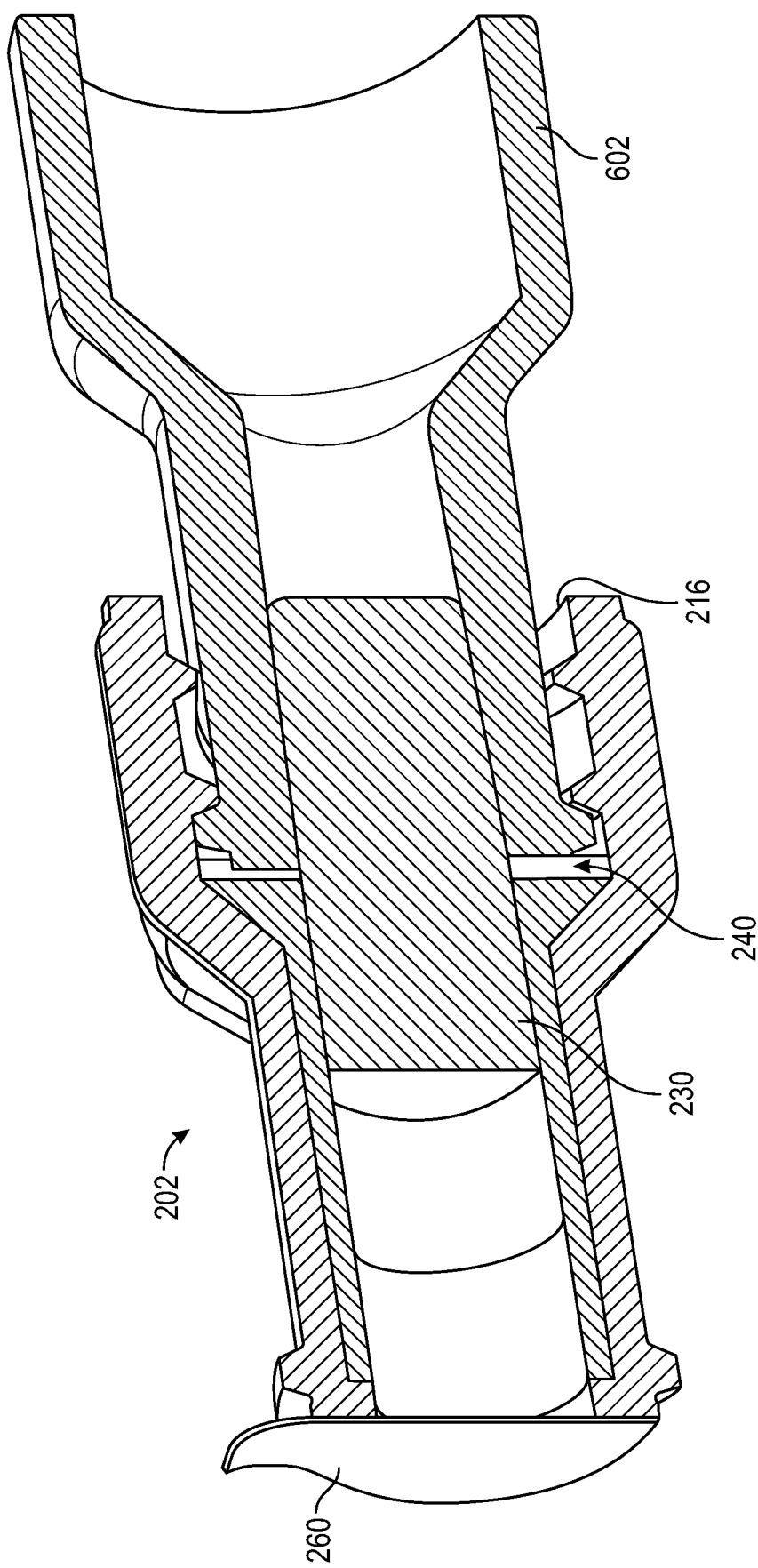
FIG. 21 shows a partial cross-sectional view showing connection of the device of FIG. 15 to a female luer connector according to an alternative embodiment of the present disclosure taken along line 18-18 of FIG. 15.

Referring to FIG. 21, in an alternative embodiment, an elastomeric seal 240 could be placed on the interior of the cap 202 near the first absorbent material 230 in order to seal a female luer 602.

Figure 22A:
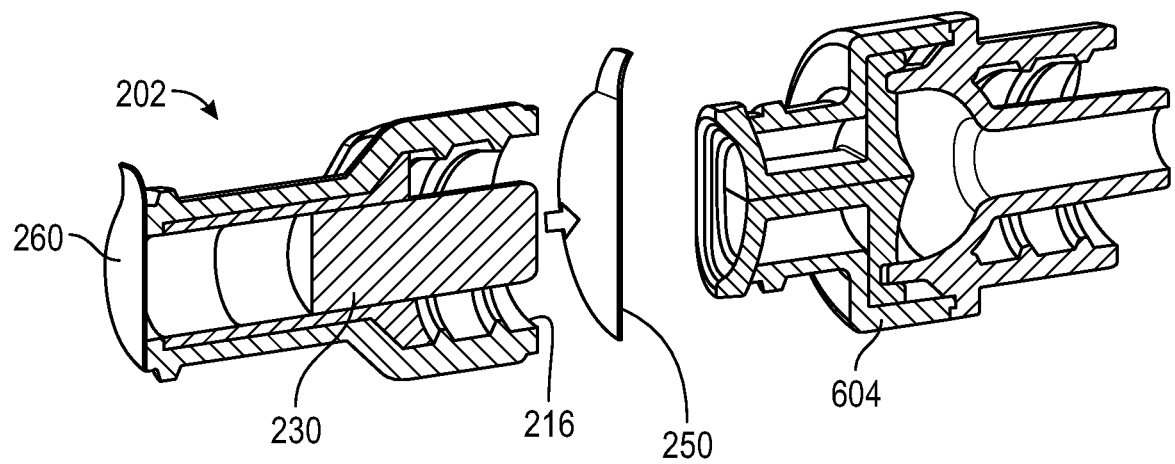
FIG. 22A shows a partial cross-sectional view showing connection of the device of FIG. 15 to a LAD taken along line 18-18 of FIG. 15.
Figure 22B:
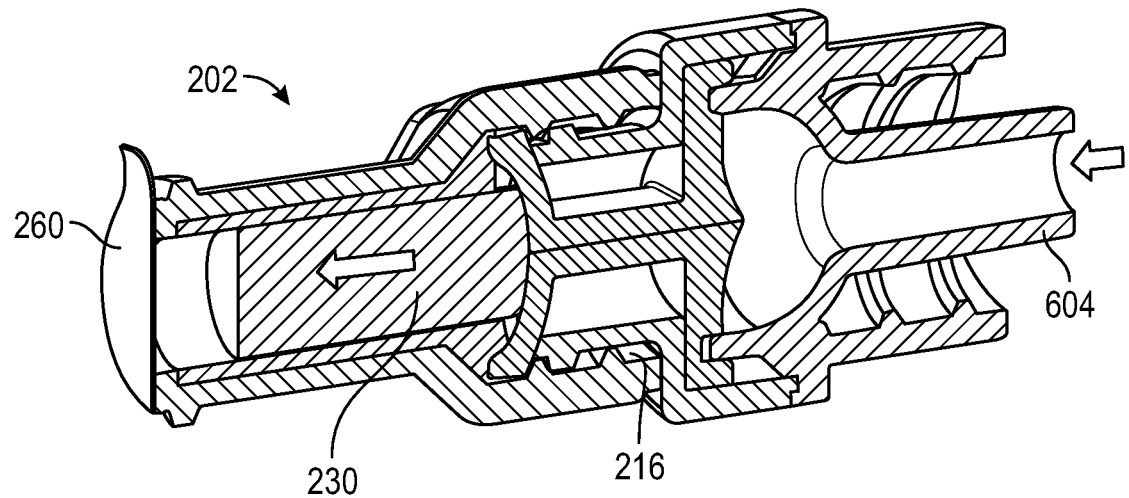
FIG. 22B shows a partial cross-sectional view showing connection of the device of FIG. 15 to a LAD taken along line 18-18 of FIG. 15.
Figure 23:
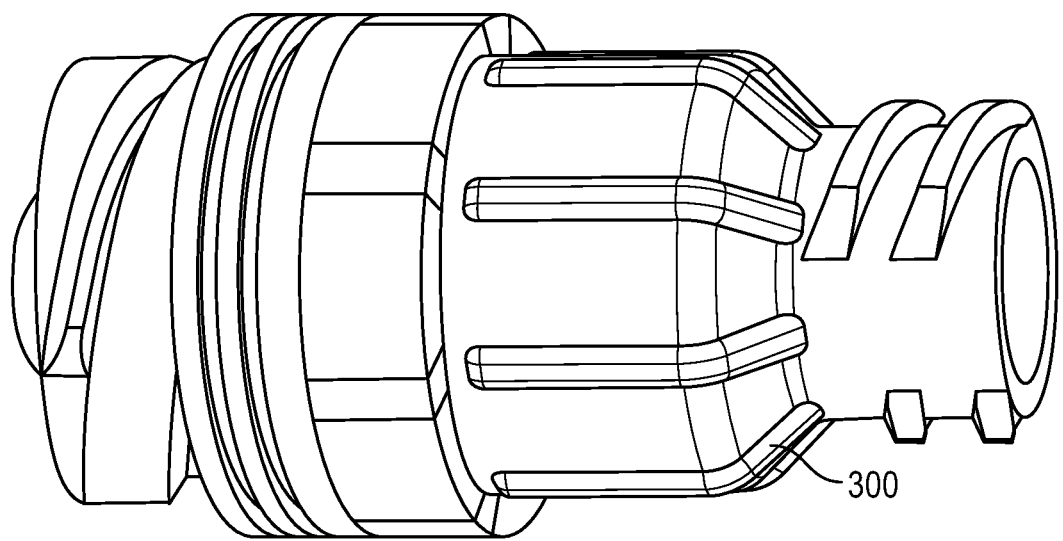
FIG. 23 shows a perspective view of a female luer connector with septum according to the prior art.
Figure 24:
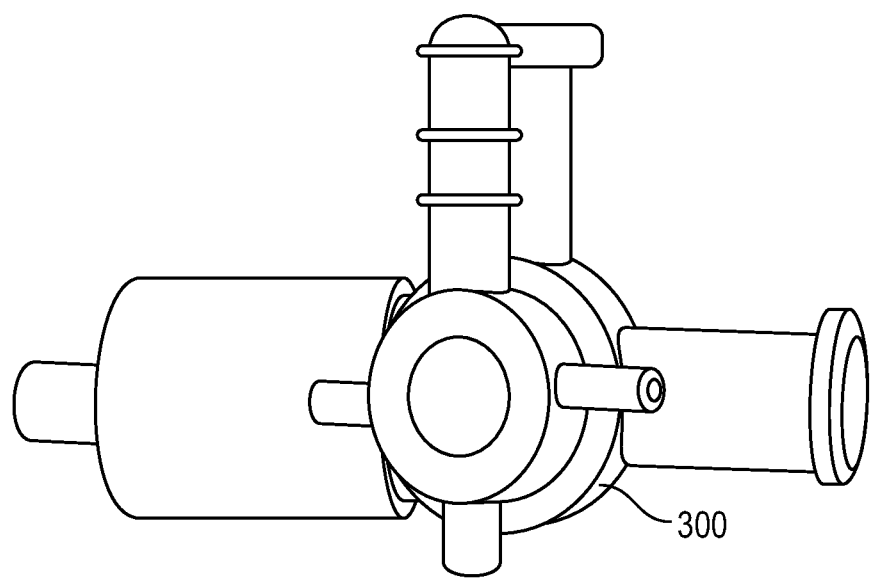
FIG. 24 shows a perspective view a female luer connector with stopcock according to the prior art.
Figure 25:
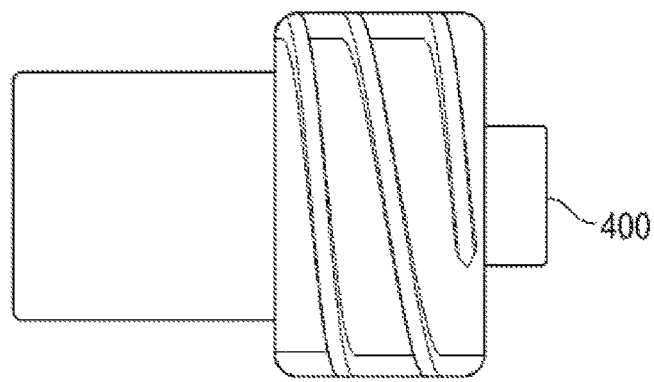
FIG. 25 shows a perspective view of a male luer connector according to the prior art.
Figure 26:
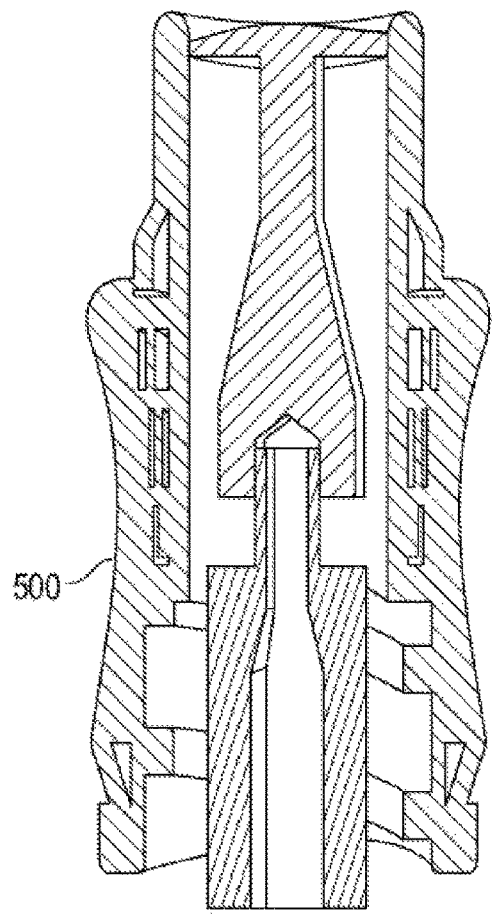
FIG. 26 shows a perspective view of a hemodialysis connector according to the prior art.

Referring to FIGS. 22A and 22B, to cap and/or disinfect a Needleless Luer Access Device (LAD) 604, such as a Q-Syte or MaxPlus, the first seal 250 is removed and the cap 202 is attached to the LAD 604 similarly to attaching the cap 202 to a female luer. The first absorbent material 230 would not penetrate the LAD 604 like it would the female luer, but instead the first absorbent material 230 would be pushed into the device 200 toward the second seal 260. This would allow room for the LAD 604, while, at the same time, allowing the disinfectant or antimicrobial agent to contact the top surface of the LAD 604, thereby disinfecting the LAD 604. LADs are self-sealing, so the device 200 does not provide a fluid seal.

In one or more embodiments, the porous and/or absorbent material(s) 230 and 232 can be stiff, can be an open cell foam, or can be a polymer sintered material that can be molded into defined shapes, similar to products produced by Porex Corporation in Fairburn, GA.

Disinfecting caps currently on the market are capable of only disinfecting one various types of connectors, e.g. female or male luer connector, etc. Thus, to avoid having to use different types of disinfecting caps to clean different types of connectors, the double-ended cap of the present disclosure engages with male luer connectors and also with female luer connectors thereby allowing the user to clean different types of connectors with a single device. Upon mounting the cap onto female luer connectors, the female luer connector is inserted into the first chamber to contact an absorbent material and disinfectant or antimicrobial agent. Upon mounting the cap onto a male luer connector, the male luer connector is inserted into the second chamber to contact an absorbent material and disinfectant or antimicrobial agent. Hence device 100 of the present disclosure can be mounted onto both male and female luer connectors thus fulfilling a current need in the art.

Referring to FIGS. 23 to 26, in one or more embodiments, the cap of the device of the present disclosure may form a fluid-tight seal with a female luer connector 300, male luer connector 400, or hemodialysis connector 500. Referring to FIGS. 23 to 26, in one or more embodiments, the cap of the device of the present disclosure is tapered to form a fluid-tight seal with a male luer connector. In specific embodiments, the cap is compliant with ISO standards (e.g., ISO 594-1:1986 and ISO 594-2:1998) for forming a seal with a male luer connector.

In one or more embodiments, the cap of the device of the present disclosure has threads that have a size and pitch to engage a threadable segment of a female connector, such as for example, a female luer connector. Such connectors are generally and commonly used as catheter and other fluid-tight protective connectors in medical applications. In some embodiments, the cap provides a protective cover for a female luer connector when engaged with the connector when threads from the female luer connector engage and form a releasable connection with threads of the cap.

In some embodiments, the connector comprises a needleless injection site, which may sometimes be referred to as a needleless injection port, hub, valve, or device, or as a needleless access site, port, hub, valve, or device, and which can include such brands as, for example, Clave® (available from ICU Medical, Inc.), SmartSite® (available from Cardinal Health, Inc.), and Q-Syte™ (available from Becton, Dickinson and Company). In some embodiments, the cap can be connected with any of a variety of different needleless injection sites, such as those previously listed. In one or more embodiments, after the cap has been coupled with connector, it is unnecessary to disinfect (e.g. treat with an alcohol swab) the connector prior to each reconnection of the connector with another connector, as the connector will be kept in an uncontaminated state while coupled with the cap. Use of the cap replaces the standard swabbing protocol for cleaning connectors.

In one or more embodiments, threads of the cap are sized and pitched to engage threads of a male luer-lock connector. For example, connector can comprise the end of an IV tubing set that is disconnected from an IV catheter needleless injection site.

A second aspect of the present disclosure pertains to methods of disinfecting medical connectors. In one or more embodiments, a method of disinfecting a medical connector comprises removing a first seal 150, connecting a male luer connector 400 to the first open end 116 to compress an absorbent material 130 in a first chamber 114 to have the disinfectant or antimicrobial agent contact and disinfect the male luer connector 400. In an alternate embodiment, a method of disinfecting a medical connector comprises removing a second seal 160, connecting a female luer connector 300 to the second open end 128 to compress an absorbent material 130 in a second chamber 126 to have the disinfectant or antimicrobial agent contact and disinfect the female luer connector 300. In yet another embodiment, a method of disinfecting a medical connector comprises removing a first seal 150, connecting a female luer connector to the first open end 116 to compress an absorbent material 130 in a first chamber 114 to have the disinfectant or antimicrobial agent contact and disinfect the female luer connector, removing a second seal 160, and connecting a male luer connector to the second open end 128 to compress an absorbent material 130 in a second chamber 126 to have the disinfectant or antimicrobial agent contact and disinfect the male luer connector.

A third aspect of the present disclosure pertains to an assembly. The assembly comprises the device 100 of one or more embodiments connected to a medical connector. In one or more embodiments, the medical connector is selected from a male luer connector, a female luer connector, a needleless connector, stopcock, and hemodialysis connector.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein has provided a description with reference to particular embodiments, it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents.

What is claimed is:

1. A device for connection to a medical connector, the device comprising:
a cap comprising an integral body having a first open end and a second open end, a first annular wall having a length defining a first chamber extending from the first open end and, a second annular wall having a length defining a second chamber extending from the second open end, the first chamber containing a first absorbent material and disinfectant or antimicrobial agent and the second chamber containing a second absorbent material and disinfectant or antimicrobial agent;
the first absorbent material having a sidewall and the second absorbent material having a friction fit with the second annular wall of the second chamber, the absorbent material in the first chamber comprising one or more concentric cylindrical grooves that corresponds with an end face of a stopcock or accommodates a lumen of a stopcock;
a first seal on the first open end to prevent the disinfectant or the antimicrobial agent from exiting the first chamber and a second seal on the second open end to prevent disinfectant or antimicrobial agent from exiting the second chamber;
the first annular wall having an exterior wall surface and an interior wall surface, the interior wall surface including the corresponding thread which comprises a plurality of internal threads adapted for connection to a female luer connector;
an elastomeric seal disposed within the first chamber, the elastomeric seal forming a ring extending from the interior wall surface of the first annular wall and surrounding the first absorbent material, the elastomeric seal configured to seal the female luer connector when connected to the plurality of internal threads; and
the second annular wall having an exterior wall surface and an interior wall surface, the exterior wall surface comprising a plurality of external threads adapted for connection to a male luer connector.

2. The device of claim 1, wherein the external threads extend from the second open end along less than one-half of the length of the second annular wall.

3. The device of claim 1, wherein the internal threads partially extend along a length of the interior wall surface.

4. The device of claim 1, wherein the internal threads fully extend along a length of the interior wall surface.

5. The device of claim 1, wherein the one or more concentric cylindrical grooves are sized and adapted to receive a male luer connector, a female luer connector or a hemodialysis connector.

6. The device of claim 1, wherein the first and/or second absorbent material comprises one or more slits.

7. The device of claim 6, wherein the one or more slits are sized and adapted to receive a male luer connector, a female luer connector or a hemodialysis connector.

8. The device of claim 1, further comprising a barrier wall disposed between the first chamber and the second chamber.

9. A device for connection to a medical connector, the device comprising:
a cap comprising an integral body, a first end including a first annular wall having a length defining a first chamber having a first open end and a second end including a second annular wall having a length defining a second chamber and a second open end, the first chamber containing a first absorbent material and disinfectant or antimicrobial agent and the second chamber containing a second absorbent material and disinfectant or antimicrobial agent;
the first absorbent material having a sidewall and the second absorbent material having a friction fit with the second annular wall of the second chamber, the first absorbent material comprising one or more concentric cylindrical grooves;
a first seal on the first open end to prevent the disinfectant or the antimicrobial agent from exiting the first chamber and a second seal on the second open end to prevent disinfectant or antimicrobial agent from exiting the second chamber;

the first annular wall having an exterior wall surface and an interior wall surface, the interior wall surface including the corresponding thread which comprises a plurality of internal threads adapted for connection to a female luer connector;

an elastomeric seal disposed within the first chamber, the elastomeric seal forming a ring extending from the interior wall surface of the first annular wall and surrounding the first absorbent material, the elastomeric seal configured to seal the female luer connector when connected to the plurality of internal threads; and the second annular wall having an exterior wall surface and an interior wall surface, the exterior wall surface comprising a plurality of external threads adapted for connection to a male luer connector.

10. The device of claim 9, wherein the external threads extend from the second open end along less than one-half of the length of the second annular wall.

11. The device of claim 9, wherein the internal threads partially extend along a length of the interior wall surface.

12. The device of claim 9, wherein the first and/or second absorbent material is a polyurethane foam.

13. The device of claim 9, wherein the one or more concentric cylindrical grooves are sized and adapted to receive a male luer connector, a female luer connector, or a hemodialysis connector.

14. A device for connection to a medical connector, the device comprising:

a cap comprising an integral body, a first end including a first annular wall having a length defining a first chamber having a first open end and a second end including a second annular wall having a length defining a second chamber and a second open end, the first chamber and second chamber containing an absorbent material and disinfectant or antimicrobial agent;

the absorbent material having a sidewall, the absorbent material in the first chamber comprising one or more concentric cylindrical grooves that corresponds with an end face of a stopcock or accommodates a lumen of a stopcock;

a first seal on the first open end to prevent the disinfectant or the antimicrobial agent from exiting the first chamber and a second seal on the second open end to prevent disinfectant or antimicrobial agent from exiting the second chamber;

the absorbent material is displaced toward the second seal upon connection to a medical connector;

the first annular wall having an exterior wall surface and an interior wall surface, the interior wall surface including the corresponding thread which comprises a plurality of internal threads adapted for connection to a female luer connector;

an elastomeric seal disposed within the first chamber, the elastomeric seal forming a ring extending from the interior wall surface of the first annular wall and surrounding the absorbent material, the elastomeric seal configured to seal the female luer connector when connected to the plurality of internal threads; and the second annular wall having an exterior wall surface and an interior wall surface, the exterior wall surface comprising a plurality of external threads adapted for connection to a male luer connector.

15. The device of claim 14, wherein the one or more concentric cylindrical grooves are sized and adapted to receive a male luer connector, a female luer connector or a hemodialysis connector.

16. The device of claim 14, wherein the internal threads partially extend along a length of the interior wall surface.

* * * * *